US011263523B1

(12) United States Patent
Duchon et al.

(10) Patent No.: US 11,263,523 B1
(45) Date of Patent: Mar. 1, 2022

(54) SYSTEM AND METHOD FOR ORGANIZATIONAL HEALTH ANALYSIS

(71) Applicant: Manzama, Inc., Bend, OR (US)

(72) Inventors: Andrew P. Duchon, Portland, OR (US); Peter J. Ozolin, Bend, OR (US); Phil H. Duong, Lake Oswego, OR (US)

(73) Assignee: Manzama, Inc., Bend, OR (US)

( * ) Notice: Subject to any disclaimer, the term of this patent is extended or adjusted under 35 U.S.C. 154(b) by 1073 days.

(21) Appl. No.: 15/880,185

(22) Filed: Jan. 25, 2018

Related U.S. Application Data

(60) Provisional application No. 62/451,345, filed on Jan. 27, 2017.

(51) Int. Cl.
| *G06E 1/00* | (2006.01) |
| *G06E 3/00* | (2006.01) |
| *G06F 15/18* | (2006.01) |
| *G06G 7/00* | (2006.01) |
| *G06N 3/08* | (2006.01) |
| *G06N 7/00* | (2006.01) |

(52) U.S. Cl.
CPC ............... *G06N 3/08* (2013.01); *G06N 7/005* (2013.01)

(58) Field of Classification Search
CPC combination set(s) only.
See application file for complete search history.

(56) References Cited

U.S. PATENT DOCUMENTS

| 7,822,750 B2 | 10/2010 | Duchon et al. |
| 8,285,619 B2 | 10/2012 | Herz et al. |
| 8,528,911 B2 | 9/2013 | Oh et al. |
| 8,538,911 B2 | 9/2013 | Kass et al. |
| 8,781,989 B2 | 7/2014 | Duchon |
| 8,788,261 B2 | 7/2014 | Sikstrom et al. |
| 9,141,686 B2 | 9/2015 | Kern et al. |
| 9,165,254 B2 | 10/2015 | Duchon et al. |
| 9,292,491 B2 | 3/2016 | Sikstrom et al. |

(Continued)

OTHER PUBLICATIONS

US 8,744,992 B2, 06/2014, Duchon (withdrawn)

(Continued)

*Primary Examiner* — Luis A Sitiriche
(74) *Attorney, Agent, or Firm* — Blank Rome LLP

(57) ABSTRACT

Techniques related to a system for news classification comprising one or more non-transitory memory devices and one or more hardware processors configured to execute instructions from the one or more non-transitory memory devices to cause the system to receive an article, the article including text, extract text from the received article, store the extracted text in a database, determine a set of potential target entities based on the extracted text, determine a classification of the article for each potential target entity of the set of potential target entities for a category, valence, presence of litigation, rumor, or opinion based on the extracted text, associate the classification of the article, along with a probability of the determined classification of the article for each potential target entity, assign the classification of the article if the probability of the classification is greater than a threshold probability, and store the classification of the article and the probability.

22 Claims, 21 Drawing Sheets

(56) References Cited

U.S. PATENT DOCUMENTS

2013/0138577 A1     5/2013  Sisk
2016/0371618 A1*   12/2016  Leidner .................. G06N 5/025

OTHER PUBLICATIONS

"Nugent et al., Risk Mining: Company-Risk Identification from Unstructured Sources, 2016, IEEE 16th International Conference on Data Mining Workshops, pp. 1308-1311" (Year: 2016).*

"Teodorescu, Machine Learning Methods for Strategy Research, 2017, Harvard Business School and USPTO HBS Working Paper 18-011" (Year: 2017).*

"Kwon et al., Rumor Detection over Varying Time Windows, 2017, PLOs ONE, vol. 12, Iss. 1" (Year: 2017).*

"Richard et al., Neural Network Classifiers Estimate Bayesian a posteriori Probabilities, 1991, Neural Computation, vol. 3, Iss. 4, p. 461-483" (Year: 1991).*

"Wang et al., A multiple distributed representation method based on neural network for biomedical event extraction, 2017, BMC Medical Informatics and Decision Making, vol. 17" (Year: 2017).*

"Kuzey et al., A Fresh Look on Knowledge Bases: Distilling Named Events from News, 2014, Proceedings of the 23rd ACM International Conference on Conference on Information and Knowledge Mangement, p. 1689-1698" (Year: 2014).*

"Kaikhah, Automatic text summarization with neural networks, 2004, International IEEE Conference on 'Intelligent Systems', pp. 40-44" (Year: 2004).*

"Tran et al., Structured summarization for news events, 2013, Companion: Proceedigns of the 22nd International Conference on World Wide Web, p. 343-348" (Year: 2013).*

"Glavas et al., Event graphs for information retrieval and multi-document summarization, 2014, Expert Systems with Applications, vol. 41, Iss. 15, p. 6904-6916" (Year: 2014).*

"Marujo et al., Exploring events and distributed representations of text in multi-document summarization, 2015, Knowledge-Based Systems, vol. 94, Iss. 15, p. 33-42" (Year: 2015).*

"Peng et al., Efficient adverse drug event extraction using Twitter sentiment analysis, 2016, IEEE / ACM International Conference on Advances in Social Networks Analysis and Mining" (Year: 2016).*

"Fang et al., Word-sentence co-raking for automatic extractive text summarization, 2017, Expert Systems with Applications, vol. 72, p. 189-195" (Year: 2017).*

"Automated Document Classification for News Article in Bahasa Indonesia based on Term Frequency Inverse Document Frequency (TF-IDF) Approach" Ari Aulia Hakim,et al (Year: 2014).*

Peramunetilleke et al., "Currency Exchange Rate Forecasting from News Headlines," ☐, Copyright © 2001, Australian Computer Society, Inc. This paper appeared at the Thirteenth Australasian Database Conference (ADC2002), Melbourne, Australia. Conferences in Research and Practice in Information Technology, vol. 5.

N. K. Nguyen, et al., "Deep Bi-Directional Long Short-Team Memory Neural Networks for Sentiment Analysis of Social Data". Lecture Notes in Computer Science, vol. 9976, Oct. 29, 2016, 2 pages.

S. Hochreiter, et al., "Long Short-Term Memory", Neural Computation, vol. 9, No. 8, 1997, pp. 1735-1780.

T. Mikolov, et al., "Efficient Estimation of Word Representations in Vector Space", https://arxiv.org/abs/1301.3781, 2013, 12 pages.

Y. Kim, "Convolutional Neural Networks for Sentence Classification", http://arxiv.org/abs/1408.5882: Aug. 25, 2014, 6 pages.

T. Mikolov, et al., "Distributed Representations of Words and Phrases and their Compositionality", Advances in Neural Information Processing Systems, 2013, pp. 3111-3119.

L. van der Maaten, et al., "Visualizing Data Using t-SNE", Journal of Machine Learning Research, vol. 9, 2008, pp. 2579-2605.

R. Pascanu, et al., "How to Construct Deep Recurrent Neural Networks", http://arxiv.org/abs/1312.6026, Dec. 20, 2013, pp. 1-13.

H.-T. Cheng, et al., "Wide & Deep Learning for Recommender Systems", http://arxiv.org/abs/1606 07792; Jun. 24, 2018, 4 pgs.

M.J. Kusner, et al., "From Word Embeddings to Document Distances", Proceedings of the 32nd International Conference on Machine Learning, Jun. 2015, PMLR vol. 37, pp. 957-966.

R. Nallapati, et al., "Abstractive Text Summarization Using Sequence-to-Sequence RNNs and Beyond", https://arxiv.org/abs/1602.06023, 2016, pp. 1-12.

G. Erkan, et al., "LexRank: Graph-Based Lexical Centrality as Salience in Text Summarization", Journal of Artifical Intelligence Research, vol. 22, 2004, pp. 457-479.

Y. Zhang, et al., "A Sensitivity Analysis of (and Practitioners' Guide to) Convolutional Neural Networks for Sentence Classification", http://arxiv.org/abs/1510.03820, Oct. 13, 2015, pp. 1-18.

D. Peramunatilleke, et al., "Currency Exchange Rate Forecasting from News Headlines", https://pdfs.semanticscholar.org/8be9/790d0c4b7bceeed174ad818c81Qb36f738ad.pd; Feb. 2002; 9 pgs.

News & Research, "A Custom Morning News Briefing", Bloomberg Terminal; Jan. 2017; 5 pgs.

Thomson Reuters News Analytics—Revolutionizing News Analysis: 2010; 2 pages.

Thomson Reuters Marketpsych Indices—Easy-to-Interpret Real-Time Psychological Analysis of News and Social Media; 2012. 4 pgs.

World News Analysis and Actionable Data—Thomson Reuters News Analysis & MarketPhych Indices; 2017; 5 pgs.

Markstpsych—Distilling the Sentiments and Emotions of Financial Markets; https://www.marketpsych.com; 2017; 11 pgs.

Thomson Reuters Adds Sentiment Data on Companies to its MarketPsych Indices; Intelligent Trading Technology; Jun. 2015; 6 pgs.

Easty-to-Interpret Reel-Time Analytics Across News and Social Media; Thomson Reuters MarketPsych Indices—Psychological insight. Market foresight.; 2015; 4 pgs.

R. B. Robbins, et al., "Writing Effective Risk Factor Disclosure in Offering Documents and Exchange Act Reports", Insights—The Corporate & Securities Law Advisory; vol. 19, No. 5, May 2005. 8 pgs.

Risk Factor Metrics; Intelligize: https://www.intelligize.com/blog/risk-factor-metrics, Jun. 12, 2010; 5 pgs.

* cited by examiner

| Operations | Management | Financials | Government | Deals & Competitors | Products & Services |
|---|---|---|---|---|---|
| Labor | Executive Movements | Bankruptcy | Regulations | Mergers & Acquisitions | Product |
| Expansion & Contraction | Executive Pay | Stock News | Taxes | Partnerships | Sales |
| Supply Chain | Misconduct | Financials | Politics | Competition | Intellectual Property |
| Attacks & Disasters | Shareholders | Analyst | | | Public Sentiment |
| Cyber Issues | Executives | | | | Product Liability |
| | Insider Transactions | | | | |

| Other |
|---|
| Conference |
| Crime |
| Spam |
| Marketing |
| Non-Target |
| Non-English |

| Aspect Model (True or False) |
| --- |
| Litigation |
| Rumor |
| Opinion |

900

| | CDID | COMPANY | HEADLINE | PUBLISHED DATE | CATEGORY | VALENCE |
|---|---|---|---|---|---|---|
| ☐ | 20936085136 | Prudential Financial | Prudential Financial, Inc. EVP Charles F Lowrey Sells 44,630 Shares | Nov. 13, 2017 | Insider Transactions ⇵ | Negative ⇵ |
| ☐ | 20936085162 | Desjardins | Desjardins Boosts Manulife Financial Corp. Price Target to C$30.00 | Nov. 13, 2017 | NON-TARGET ⇵ | ---------- ⇵ |
| ☐ | 20936077638 | JP Morgan Chase | ANALYSE-FLASH: JPMorgan hebt Ziel fur Deutsche Pfandbriefbank auf 12,60 Euro | Nov. 13, 2017 | NON-ENGLISH ⇵ | ---------- ⇵ |
| ☐ | 20936084881 | Qualcomm | US: Qualcomm rejects Broadcom's record-breaking US$105b takeover attempt | Nov. 13, 2017 | Mergers & Acquisitions ⇵ | Negative ⇵ |
| ☐ | 20936072020 | General Electric | GE restructures: Focuses on healthcare, aviation, energy; scales back on 5 other businesses | Nov. 13, 2017 | Expansion & Contraction ⇵ | Negative ⇵ |

FIG. 9

SYSTEM AND METHOD FOR ORGANIZATIONAL HEALTH ANALYSIS

CROSS-REFERENCE TO RELATED APPLICATION

This application claims priority from U.S. Provisional Patent Application Ser. No. 62/451,345, entitled "SYSTEM AND METHOD FOR ANALYZING INFORMATION," filed on Jan. 27, 2017, which for any and all purposes is hereby incorporated by reference in its entirety as if fully set forth herein.

TECHNICAL FIELD

Embodiments described herein generally relate to text classification, and in particular, classification of a health of a relationship between an organization and another entity based on texts related to the organization.

BACKGROUND ART

Individuals providing or looking to provide services to an organization should generally have an understanding about specific and holistic circumstances surrounding the organization to help predict potential future situations that are likely to occur. When the organization is a corporation, information about present circumstances may come in the form of hard, structured, data such as the corporation's stock price or its credit rating. However, many circumstances of the corporation may be described in soft, unstructured, data or text, such as news, social media posts, and corporate or legal filings. Because of the volume and decentralized nature of soft data, it may be difficult to find, read, and understand all these texts. To help users find relevant soft data about an organization, alerting, or current awareness services exist to bring relevant soft data to an interested reader as the soft data are published. However, these services generally require individuals to read a publication, place the publication in context with any prior publications (if they were read), and attempt to organize and/or link the publications to understand the full context of the corporation's circumstances, discern patterns, relationships, and predict future outcomes. Because of the complexity required in this endeavor, individuals too often make ill-informed inferences based on limited or incomplete data or assumptions. Moreover, future implications of present circumstances are difficult to ascertain, thus making it difficult for the individual to know which services will be needed by the corporation.

Thus there is a need for a system that allows an individual to be informed about an organization by assessing developments about the organization using both soft data and hard data, as not just isolated events but as patterns of connected information within the larger data stream, gain a deeper and more comprehensive understanding of where risks or opportunities lie for the organization, and assess which services the individual could provide. In addition, an individual may want to compare and prioritize one organization against another to determine which one to pursue, as the user has finite resources. Moreover, an organization could be comprised of a set of other organizations. For example, the oil industry is comprised of oil companies, unions, trade organizations such as OPEC, regulatory agencies, etc. An organization may also be comprised of a set of organizations having a particular attribute such as their physical location, for example, a corporate headquarters in a particular country, or by market capitalization or position. This larger organization would also need to be independently monitored, understood, predicted, serviced, counseled, and compared to other organizations, companies, industries, etc.

Recent advances in neural networks make analysis of text for these purposes much more accurate and scalable. A number of techniques for analyzing news have appeared in the scientific and patent literature. Many of these techniques (e.g., U.S. Pat. No. 8,788,261) create a semantic space of individual words that appear in the text. However, such techniques are incapable of capturing semantic relationships, especially as they relate to the relationship between the organization and another entity mentioned in the text. Other approaches (e.g., U.S. Pat. No. 8,528,911) have created hundreds or even thousands of event types and attempt to map text to slots of information associated with the event, e.g., A sold B. These approaches are time intensive as humans must create individual events and new event types may not be captured properly. To address the latter situation, some approaches (e.g., U.S. Pat. No. 8,744,992) use unsupervised topic modeling to cluster all the data. Text then has a most likely topic associated with it. However, this topic is a bag of words, open to interpretation and often may not be interpretable at all. This bag-of-words approach also does not capture the semantic relationships between entities. As far as these techniques have been used for prediction, they are typically used to predict a stock price or some other time-varying variable, by mapping, either directly, via the semantic space, and/or event type, the individual words to a value. The event-based and topic-based methods use statistical approaches to find temporal patterns for predicting the likelihood of future too-specific events, or too-vague topics However, these techniques do not capture relationships between an organization and other entities at the appropriate level of abstraction that can be understood by a person to assess the services that the organization may need. These techniques also do not address the need to compare one organization to others.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

A news analysis product comprising a non-transitory machine-readable medium, event processing control instructions stored on the non-transitory machine-readable medium operable over a network to present to a user an overview of an entity which presents counts of designated positive, negative and neutral articles in a given time period in a subset of categories or all categories are used to assign a score to the target entity for all or a selected set of target entities, the target entity score for each of a subset of categories, the stories on a graph where stories are visually associated with the storyline to which they are assigned and visually represent the magnitude and valence of the story or storyline and the story's or storyline's summary, where the user can filter out those stories or storylines possessing or not possessing any of the other classifications assigned by the system, the relationship between the target entity score and some other inherent or derived metadata for each of a set of entities, where the user can filter out those entities that do not have a minimum number of co-mentions, where the user can filter out those entities possessing or not possessing particular metadata such as, if the entity is a company, an industry, market capitalization, etc., other entities besides a target entity by their ranked association with the target entity within a story or storyline or overall within a time period, where the user can filter out those entities that do not have a minimum number of co-mentions, where the user can filter out those entities possessing or not possessing particular metadata such as, if the entity is a company, an industry, market capitalization, etc., the target entity's association to other entities via a network graph where edges in the graph are based on co-mentions within a story or storyline or overall within a time period, where the user can filter out those entities that do not have a minimum number of co-mentions, where the user can filter out those entities possessing or not possessing particular metadata such as, if the entity is a company, an industry, market capitalization, etc.

Further, the system may present to a user time series sets, where the time series sets are determined by calculating the percent of all articles in a given time period for a target entity in each designated classification, calculating the percent of all articles in a given time period for a target entity in each designated valence for each designated category classification, calculating these percentages across time periods to create a time series for each category, thus creating a time series set, calculating the similarity between a time series set within a given time period of a target entity to all entities, including the target entity, across all time periods, ranking the most similar entities and time periods, ranking the most similar entities at specific time periods, and storing and displaying the time series sets, similarities, and ranks, where the entities and time periods are initially ranked by their similarity, where the user can filter out those entities that do not have a minimum number of co-mentions, and the user can filter out those entities possessing or not possessing particular metadata such as, if the entity is a company, an industry, market capitalization, etc.

Further, the system may present to a user, predictions by training a regression system to predict the values of each time series at a future time period using any or all of the time series values from a previous time period, taking as input the current time series for a target entity and using the trained regression system provide a prediction of the values of the time series at a future time period, storing the predictions, where the predictions for each category for a future time period given the present time period are calculated and presented, where the presentation consists of a number representing the percent of positive and negative valence of the prediction for any or each category, and where the presentation is a visual line connecting past and present time periods' percentages to future predicted time periods' percentages for any or each category.

Further, the system may present to a user storylines and associated metadata, such as article counts, which match criteria on one or more target entities and one or more classifications, where the user can manipulate the criteria on any of the entities or classifications, including but not limited to metadata about the entity, such as, if the entity is a company, the subsidiaries, industry type, industry position, market capitalization, domicile, employee size, debt-to-income ratio, and stock price, where this manipulation expands or limits the storylines and associated metadata shown to the user, and where the combined news based on the criteria chosen are used as input to the new similarity system and the predictions of the news similarity system.

BRIEF DESCRIPTION OF DRAWINGS

For a more complete understanding of this disclosure, reference is now made to the following brief description, taken in connection with the accompanying drawings and detailed description, wherein like reference numerals represent like parts.

FIG. 2 illustrates example news model, in accordance with aspects of the present disclosure.

FIG. 3 illustrates other categories, in accordance with aspects of the present disclosure.

FIG. 9 illustrates an example training user interface, in accordance with aspects of the present disclosure.

DESCRIPTION OF EMBODIMENTS

Figure 1:
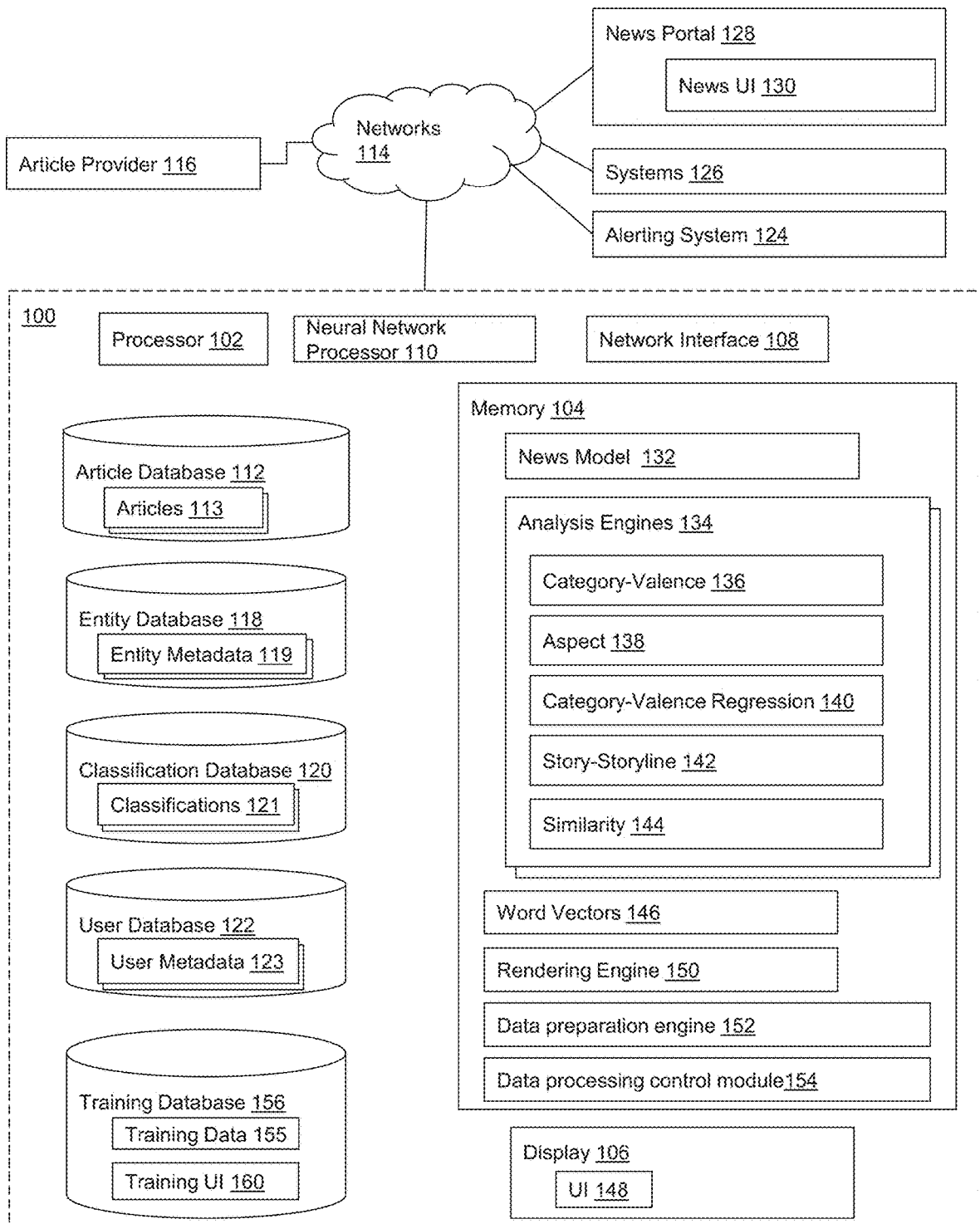
FIG. 1 illustrates a news analysis system, in accordance with aspects of the present disclosure.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "computing system" refers to a single electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

Embodiments of the present invention to provide a computer-implemented method and system to 1) classify text relating to an organization and entities associated with the organization with respect to other organizations or entities, 2) summarize the text in such a way as to be easily understood to allow for comparison and identification of similarities and relationships of the news within the classification system of one organization to other entities or organizations at the current time or at other points in time, 3) predict the likelihood of future classifications trends and news types for the organization, and 4) present this information to a user. The user may then be able to use this information to help them to determine the likely services needed by the organization.

Embodiments of the present invention are disclosed for an entity news classification system which analyzes text relative to a target entity and classifies the text according to an entity news model comprising categories of entity news, a valence within each category, and the presence of litigation, rumor, or opinion with regards to the category.

Text may be processed using a neural network configured to determine classifications for the text into various categories. Grouping and summarization of related texts within category types may be performed and this performance may occur over a period of time. Texts within a given category of the classification system may be used, over time, to train a neural network regression model to provide a prediction for a likelihood of future classifications. A score for the organization, as a whole, may be created based on scores for a category type or combination of category types and this score may be presented as the organization's holistic health score along with category scores associated with the category type. Classification, health and category scoring, plotting of the health and category scores over time, identification of past similar score patterns exhibited by other organizations, and the cross-referencing of other hard data, such as industry classifications, geographic location, market position, industry competitors, etc., may allow a user to more easily identify which organizations are likely to need a particular service now or in the future. As an example, a drop in a first category score in one category followed by a corresponding increase in a second category score in another category could, based on identified score patterns, predict the direction of future category scores.

According to certain aspects identification of target entities and an entity news model may be used to create complex relationship mapping analyses. For example, company A and company B may both be mentioned in an article classified in a Partnership category. By relaxing the constraints on any of the three elements, while maintaining other parts of the original relationship structure, similarly situated companies may be determined. For example, relaxing constraints on other entities may be used to locate other articles in the Partnership category indicating what other companies Company A may be associated with. As another example, using an industries associated with company A and Company B, such as Automotive and Technology, other companies in those industries that may be forming partnerships may be discovered. This type of information may be used to help identify similar patterns in disparate industries or identify combinations of business relationships and actions.

FIG. 1 illustrates a news analysis system 100, in accordance with aspects of the present disclosure. The news analysis system 100 is provided articles for analysis. Articles may include any written textual information from any source such as newspapers or magazines, but can also refer to other types of publications including blogs, tweets, case filings, RSS feeds, web page content and press releases. Text of articles are normalized, a process which may discard some articles. The remaining articles are classified with respect to a news model for a type of entity associated with the entity. This type of entity may be provided along with the article. The types of classifications may be based on the article's category and valence with respect to the news model, as well as some aspect of the news, such as whether it concerns litigation, is a rumor, or an opinion. The news article may be grouped with other news articles such as other articles discussing the same story. The news article may be further grouped with other articles across a period of time to form a storyline, which may have some similarities with other storylines. Finally, a regression model can be used to determine the likelihood of a valence of each category in the future.

The news analysis system 100 includes a processor 102, a memory 104, a display 106, a network interface 108, and may include a specialized neural network processor 110. An article database 112 stores articles 113 received via network 114 from an article provider 116. An entity database 118 contains metadata 119 about each entity about which news is being analyzed, which, for example, a company might contain products, key personnel, subsidiaries, and/or other metadata concerning the company.

A classification database 120 stores classifications 121, (e.g., vectorized representations of articles) and story assignments created by one or more analysis engines 134. A user database 122 stores user metadata 123, such as the user's geographic location, preferred sources, and/or entities of interest, such as particular companies or industries.

The news analysis system 100 may communicate classifications, the emergence of a new storyline, the probability (or rise in probability) of future classifications, or similar news to external systems for further processing. FIG. 1 shows an example of an alerting system 124 which receives information from the news analysis system 100. The alerting system 124 may be guided by information from the user database 122 to determine users to send alerts to. The alerting system 124 may send alerts to individuals or other systems. The news analysis system 100 may also communicate with other systems 126 feeding information into, for example, a customer relationship management software application to provide news analysis on matching customers. Another external system may be a news portal 128 which may provide a remote external interface to the news analysis system 100. The news portal implements a news user interface (UI) 130 which supports login and communicates with the news analysis system 100. The news portal may provide a textual or graphical representation of the classifications, stories, storylines, future classification probabilities and similar news, and may be modified based on data from the user database 122.

The memory 104 stores, among other elements, one or more news models 132 and analysis engines 134. Examples of analysis engines 134 may include a category-valence analysis engine 136, an aspect analysis engine 138, a category-valence regression analysis engine 140, a story-storyline analysis engine 142, and a similarity analysis engine 144. Certain analysis engines rely on word vectors 146. Analysis engines 134 may use a neural network processor 110, such as a graphics processing unit (GPU) or tensor processing unit (TPU), to perform neural network computations during training with training data 155 contained in training database 156 or when processing data from article provider 116. The training database 156 may also include a training UI 160.

The processor 102 generates a UI 148 for display on display 106. The UI 148 may provide a textual or graphical representation of the classifications, stories, storylines, future classification probabilities, or similar news and may be modified based on data from the user database 122. These data may be organized by the entity (e.g., a company), industry, or by metadata about the entity (e.g., market capitalization) or metadata about the news, e.g., article volume, or any preferences of the user. The news analysis system 100 may include a rendering engine 150 for rendering a UI, which may process the output of the data preparation system 152, which may coordinate the training process. A data processing control module 154 may coordinate the processing of the news analysis system 100 overall.

Network interface 108 connects the news analysis system 100 to networks 114. The networks 114 may be internal or external networks, including but not limited to company intranets, local area networks, and the Internet. The networks 114 connect the system 100 to the article provider 116. The article provider 116 may be a trusted source of articles concerning the entities in the entity database 118. The article provider 116 may send articles with the content of the article, the source name, the URL of the article, the publication date, and the entities the article may be concerned with. Other information, or less information, may also be sent by the article provider 116.

The system 100 also includes a training database 156 containing training data which may also include a training UI 160 to create and/or modify data used for training by the analysis engines 134.

While a company or corporation will be used as the target entity in the following discussion and examples, this is not intended to be limiting and the target entity may include industries, geographical areas, items of entertainment, or even individual humans, as long as articles are being written about the target entity.

FIG. 2 illustrates example news model 200, in accordance with aspects of the present disclosure. In this example, the target entity is a corporation and articles about the corporation may be classified by the category-valence model 136 with respect to health subfactors which refer to specific types of interactions other entities may have with the target entity. These health subfactors (e.g., Partnerships, Financials, Labor, etc.) may be grouped into a smaller set of health factors (e.g., Operations, Management, Financials, etc.). As used herein, valence refers to a polarity, such as a positive or negative aspect, goodness or badness, of an article with respect to the target entity. When the valence of the article cannot be determined, or both positive and negative news is contained in the article, then it is labeled neutral.

When the news model is for corporate entities, the health subfactors, or news categories, are those generally related to risks that might appear in a US public company's annual 10-K or periodic 10-Q report required by the Securities and Exchange Commission. Common risks disclosed in these forms are described briefly in http://www.intelligize.com/blog/risk-factor-metrics/and http://www.pillburylaw.com/siteFiles/Publications/77EA643CE089DDA568EFF79F0A35F681.pdf. These risks may be generalized and expanded, into a larger health factors grouping of risks as shown in FIG. 2 with examples in TABLE 1 of negative and positive valence article headlines. Example headlines are provided, but it is understood that these techniques could apply to the full text of the article as well.

TABLE 1

| Health Subfactor | Positive | Negative |
|---|---|---|
| Partnerships | AbbVie (ABBV), argenx Enter Collaboration | Infinity Axes 100 as AbbVie Ends Duvelisib Collaboration |
| Executive Movement | New roles for Joshua Smiley and Anat Ashkenazi at Lilly, as Thomas Grein retires | Flagship snaps up Merck CMO [for Merck] |
| Expansion & Contraction | Pfizer expanding API plant in Australia | Merck To Lay Off 360 R&D Employees |

TABLE 1-continued

| Health Subfactor | Positive | Negative |
|---|---|---|
| Financials | Allergan plans to buy back $10 B in shares, posts 1 Q profit | Pernix in talks with creditors about debt restructuring |
| Intellectual Property | Merck wins hepatitis C virus drug patent case against Gilead [for Merck] | AbbVie Patent on Humira May Be Invalid, U.S. Agency Says |
| Labor | Unions approve contract with American Airlines | More Than 400 Women Are Now Suing Merck for Unequal Pay |
| Product | Pfizer Prevails In Zoloft Birth Defect MDL | 4th Circ. Revives FCA Suit Over Pfizer Pain Patch |
| Mergers & Acquisitions | AbbVie to acquire Stemcentrx for $5.8 B | Pfizer and Allergan scrap $160 billion 'inversion' deal |
| Regulation | Indian court grants Pfizer stay on ban of popular cough syrup | FTC Wins Androgel Info From AbbVie In Antitrust Suit |
| Stock | Allergan Rallies Ahead Of Q1 Report | AbbVie Inc (ABBV) stock tanks |
| Tax | Allergan Scores $58 M Tax Break To Remain In NJ | New U.S. inversion rules threaten Pfizer-Allergan deal |

Other corporate health categories may include cybersecurity (i.e., data breaches), public sentiment, supply chain, and other types of interactions with other entities which tend to affect the health of any corporation.

As seen in the table, there are cases where the valence changes, depending on the target company. For example, when Company A wins a lawsuit against Company B, this is positive news for Company A, but negative news for Company B.

FIG. 3 illustrates other categories 300, in accordance with aspects of the present disclosure. The news model 132 may also contain other categories not related to the target entity or the target entity's health, but when identified as such are easier to exclude from the rest of the processing. FIG. 3 illustrates six such categories which may be part of category-valence model 136.

Figure 4:
FIG. 4 illustrates an aspect model, in accordance with aspects of the present disclosure.

FIG. 4 illustrates an aspect model 400, in accordance with aspects of the present disclosure. The news model 132 may also classify articles based on an aspect model 138 which is independent of the category-valence model 136. In the case of corporate entities, there may be three aspects to the news as shown in FIG. 4 which are either present or absent in the article. The presence or absence of these three aspects may occur with any combination of category and valence from 136.

The article provider 116 is separate from the news analysis system 100, but provides articles which are potentially related to target entities contained in 118. Articles may be provided by creating boolean queries designed to identify articles about a target entity. For example, the article provider 116 may create a boolean search for an industry target entity such as the Oil and Gas Industry which might look like: ("Oil & Gas" OR "crude oil" OR "Natural Gas" OR "LNG" OR "hydrocarbons" OR "OPEC" OR "offshore drilling" OR "EPACT" OR "energy policy act" OR "Canadian Gas Association" OR "oil spill" OR "petroleum" OR "hydraulic fracturing") AND NOT ("vegetable oil" OR "palm oil"). A boolean query for a corporate Target Entity, such as Apple, Inc. might look like ("Apple" OR "Macintosh" or "Steve Jobs" or "iOS" AND NOT ("apple pie")). The article provider 116 has the means to search the Internet, receive RSS feeds, access other data repositories of articles. Articles matching the boolean query for a particular target entity may be sent via the network interface 118 to the news analysis system 100, along with other metadata about the article, such as date and place of publication, and the target entity or entities that were identified in the article.

Figure 5:
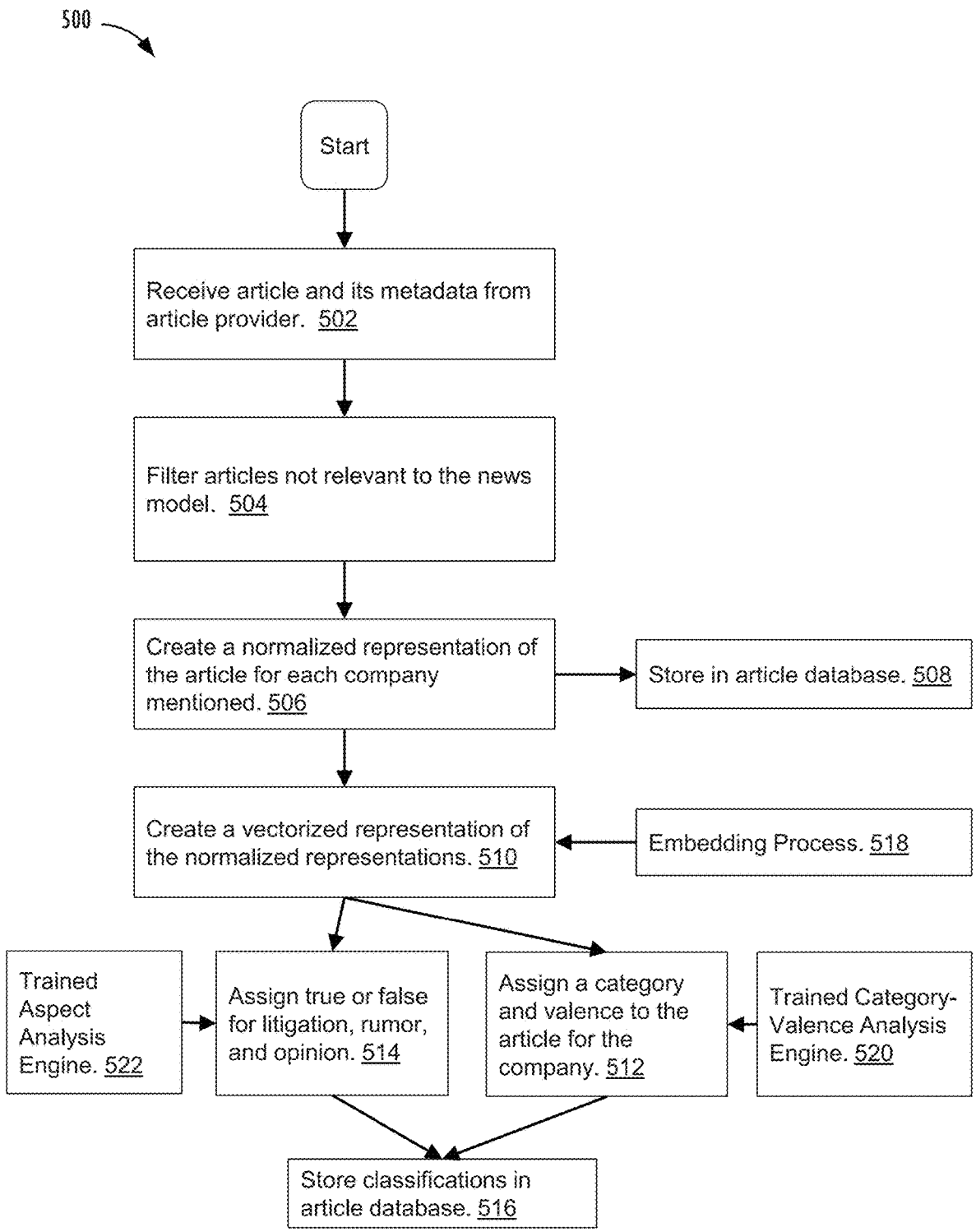
FIG. 5 illustrates a classification process, in accordance with aspects of the present disclosure.

FIG. 5 illustrates a classification process 500, in accordance with aspects of the present disclosure. In certain cases, the classification process 500 may be performed by the category-valence analysis engine 136 and the aspect analysis engine 138. At block 502, articles and their associated metadata are received from the article provider. At block 504, articles may be filtered and discarded for various reasons, such as a lack of metadata from the entity database, or where a company's name is not in a headline.

At block 506, a normalized representation of the article is created, one for each mentioned company. In certain cases, normalization may replace known company-specific terms in the text with generic terms. For example, given the headline "BRIEF-Selvita signs another deal with Merck KgaA," common headline functions and stopwords may be removed, resulting in text such as "Selvita signs deal Merck KGaA". With respect to the company Merck, the text may be normalized to "Selvita signs another deal COMPANYX". A second normalized representation for Selvita may also be created such as "COMPANYX signs deal with Merck KGaA". Zocor is a product of Merck, so the headline "Camber launches generic Zocor" may be normalized to "Camber launches generic PRODUCTX". Kenneth Frazier is the CEO of Merck, so the headline "Kenneth C. Frazier Sells 60,000 Shares of Merck & Co. (MRK) Stock" may be normalized to "PERSONX Sells NUMBER Shares COMPANYX Stock." These normalized representations may be stored at block 508 in the article database 112.

Figure 6:
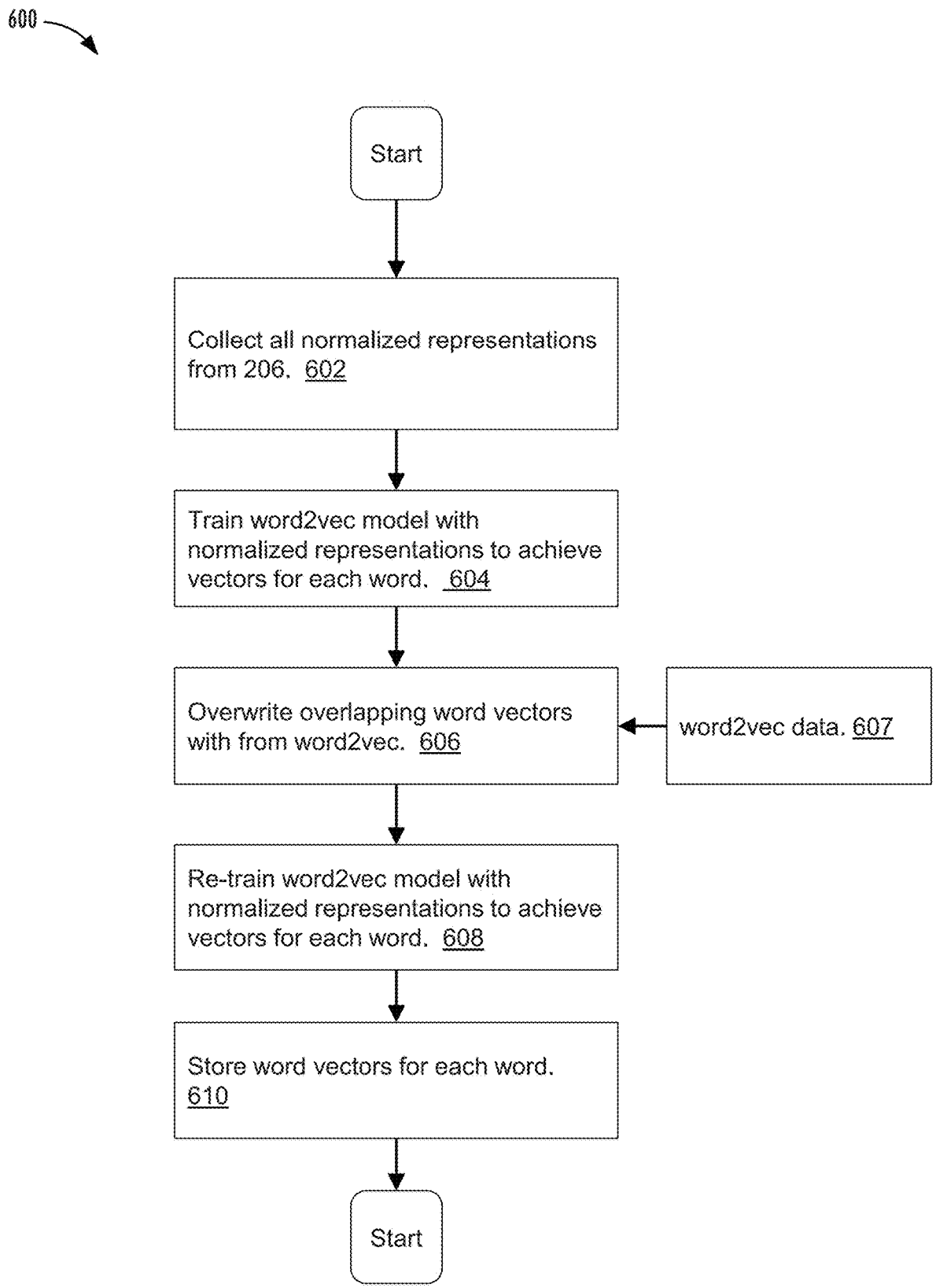
FIG. 6 illustrates an example embedding process, in accordance with aspects of the present disclosure.

The normalized representation may then converted at block 510 into a vectorized representation (e.g., word vectors 146) via an embedding process 518 described in more detail in conjunction with FIG. 6. The vectorized representation may be input to the category valence analysis engine 520 as described in more detail below. At block 512, category valence analysis engine 520 classifies the article into category and valence combinations, independently for each company given the vectorized representation of the article for that company. The vectorized representation may be input to the aspect analysis engine 522 as described in more detail below. The aspect analysis engine 522 classifies, at block 514 the article into true or false for the presence of litigation, rumor, or opinion, independently for each company given the vectorized representation of the article for that company. Both sets of classifications are then stored 516 in the classification database 120.

FIG. 6 illustrates an example embedding process 600, in accordance with aspects of the present disclosure. At block 602, normalized representations are either created or if already created, pulled from the article database. At block 604, these representations are used to train a word2vec model as described in Mikolov, T., Sutskever, I., Chen, K., Corrado, G. S., & Dean, J., Distributed Representations of Words and Phrases and Their Compositionality, Advances in Neural Information Processing Systems 3111-3119 (2013) and Mikolov, T., Chen, K., Corrado, G., & Dean, J., Efficient Estimation of Word Representations in Vector Space, arXiv 1301.3781 (2013) available at https://arxiv.org/abs/1301.378. Google has released vectors trained on the Google News dataset of 100 billion words, available at https://docs.google.com/uc?id=0B7XkCwpI5KDYNINUTT1SS21pQm&export=download. At block 606, the vectors for words available the Google's word2vec data 607 are substituted for those vectors created in 604. At block 608, a second round of training is then performed with the normalized representations. At block 610, the resulting word embeddings are stored.

Figure 7:
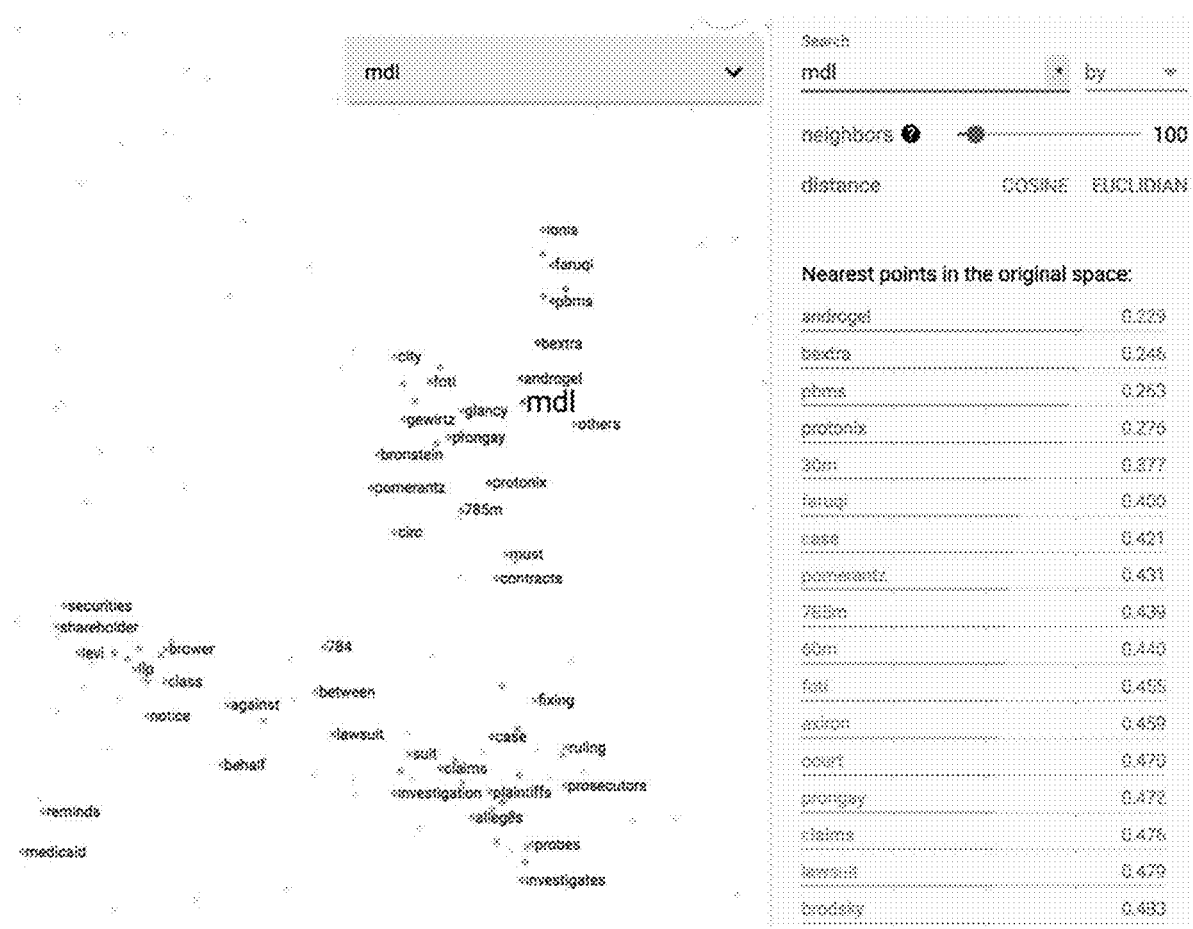
FIG. 7 illustrates an example of a subset of the embedding space, in accordance with aspects of the present disclosure.

FIG. 7 illustrates an example of a subset of the embedding space 700, in accordance with aspects of the present disclosure. The t-sne algorithm, as described in Maaten, L. V. D., & Hinton, G., Visualizing Data Using t-SNE, Journal of Machine Learning Research, 2579-2605. (Nov. 9, 2008), is used to create this visualization as implemented at http://projector.tensorflow.org/. While focused on the word "mdl" (for multidistrict litigation, common in complex product liability lawsuits) we see that products that have had such lawsuits are nearby, as well as other related terms such as "case".

Figure 8:
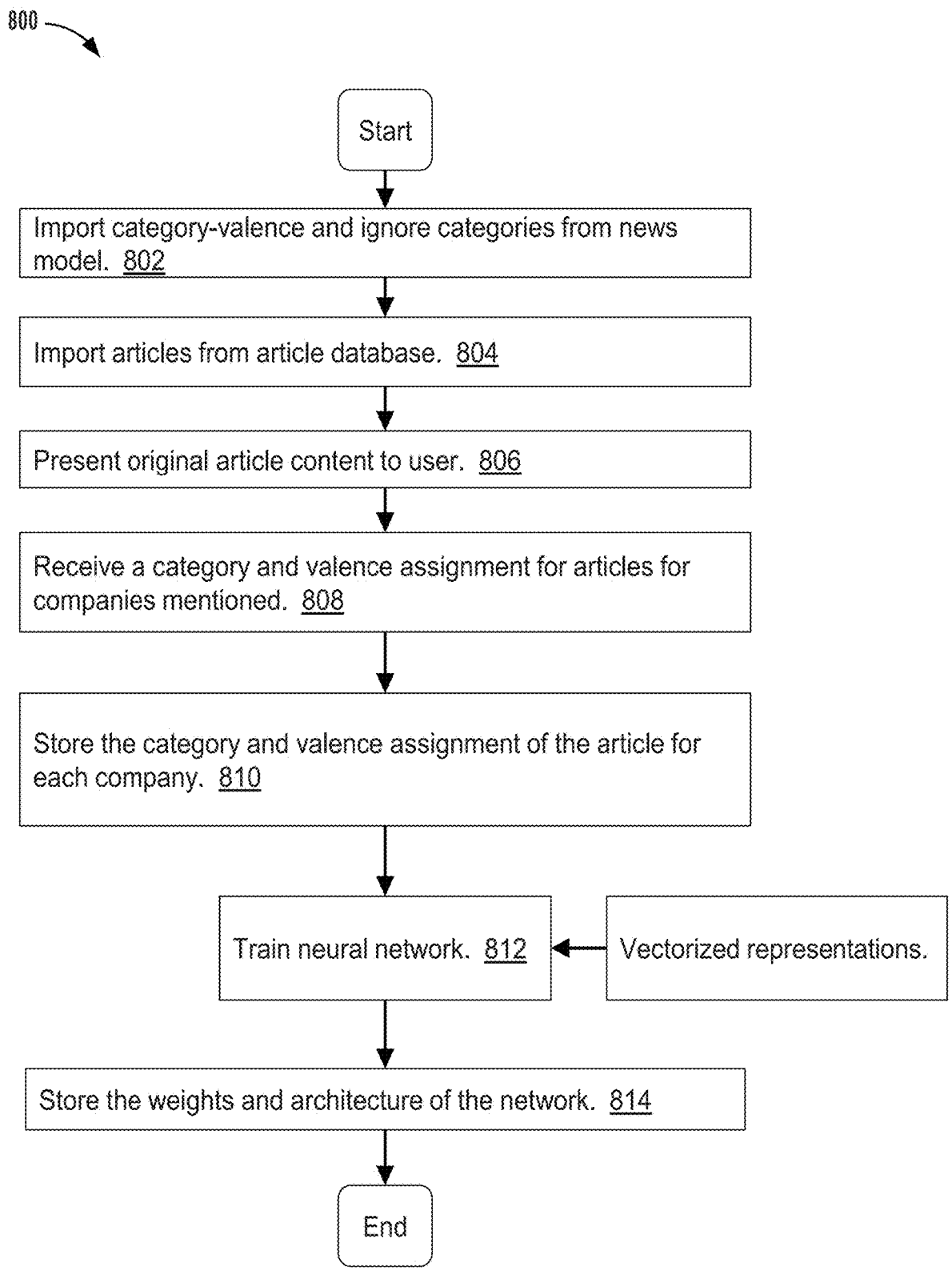
FIG. 8 illustrates an example process for creating a category-valence analysis engine, in accordance with aspects of the present disclosure.

FIG. 8 illustrates an example process 800 for creating a category-valence analysis engine, in accordance with aspects of the present disclosure. At block 802, categories from the news model are imported. At block 804, articles from the article database 112 are imported. At block 806, this data may be presented to a training user via the training user interface 900, an example of which is shown in FIG. 9. At block 808, category and valence assignments for articles and mentioned companies, as determined by the training user, are received. At block 810, these assignments for the articles are stored in the training data database 156 associated with the respective companies. According to certain aspects, the stored assignments comprise a set of preassigned articles that may be used to train the neural network. At block 812, a neural network is trained with the category and valence assignments from block 810 set as a desired output and the vectorized representations from block 510 of FIG. 5 of the articles as input. For example, for each article and company having an assigned category and valence, weights of nodes in a neural network may be adjusted with the vectorized representation of the article as input, and the combination of the category and valence as the output. At block 814, the trained neural network is stored, including weights of nodes and architectural details of the neural network, such as how the nodes are interconnect, etc.

According to certain aspects, the exact neural network model architecture may vary. For example, the model architecture may be implemented as a long short-term memory network, which are good at capturing the syntax of sentences without natural language processing. See Hochreiter, S., & Schmidhuber, J., Long Short-Term Memory, Neural computation 9(8), 1735-1780 (1997). The model architecture may also incorporate techniques for capturing long range word dependencies for categorization, such as discussed in Nguyen, Ngoc Khuong, Anh-Cuong Le, & Hong Thai Pham, Deep Bi-Directional Long Short-Term Memory Neural Networks for Sentiment Analysis of Social Data, Lecture Notes in Computer Science, vol. 9978. The model architecture may also incorporate techniques for categorization using convolutional neural networks, such as discussed in Kim, Yoon, Convolutional Neural Networks for Sentence Classification, arXiv, 1408.5882 [Cs] (Aug. 25, 2014) available at http://arxiv.org/abs/1408.5882. Best practices may come from Zhang, Ye, &Byron Wallace, A Sensitivity Analysis of (and Practitioners' Guide to) Convolutional Neural Networks for Sentence Classification, arXiv, 1510.03820 [Cs] (Oct. 13, 2015) available at http://arxiv.org/abs/1510.03820. Metadata about companies, such as industry or revenues, and about the article such as author or source might be incorporated into the model using techniques from Cheng, Heng-Tze, et al., Wide & Deep Learning for Recommender Systems, arXiv, 1606.07792 [Cs, Stat] (Jun. 24, 2016) available at http://arxiv.org/abs/1606.07792.

Figure 10:
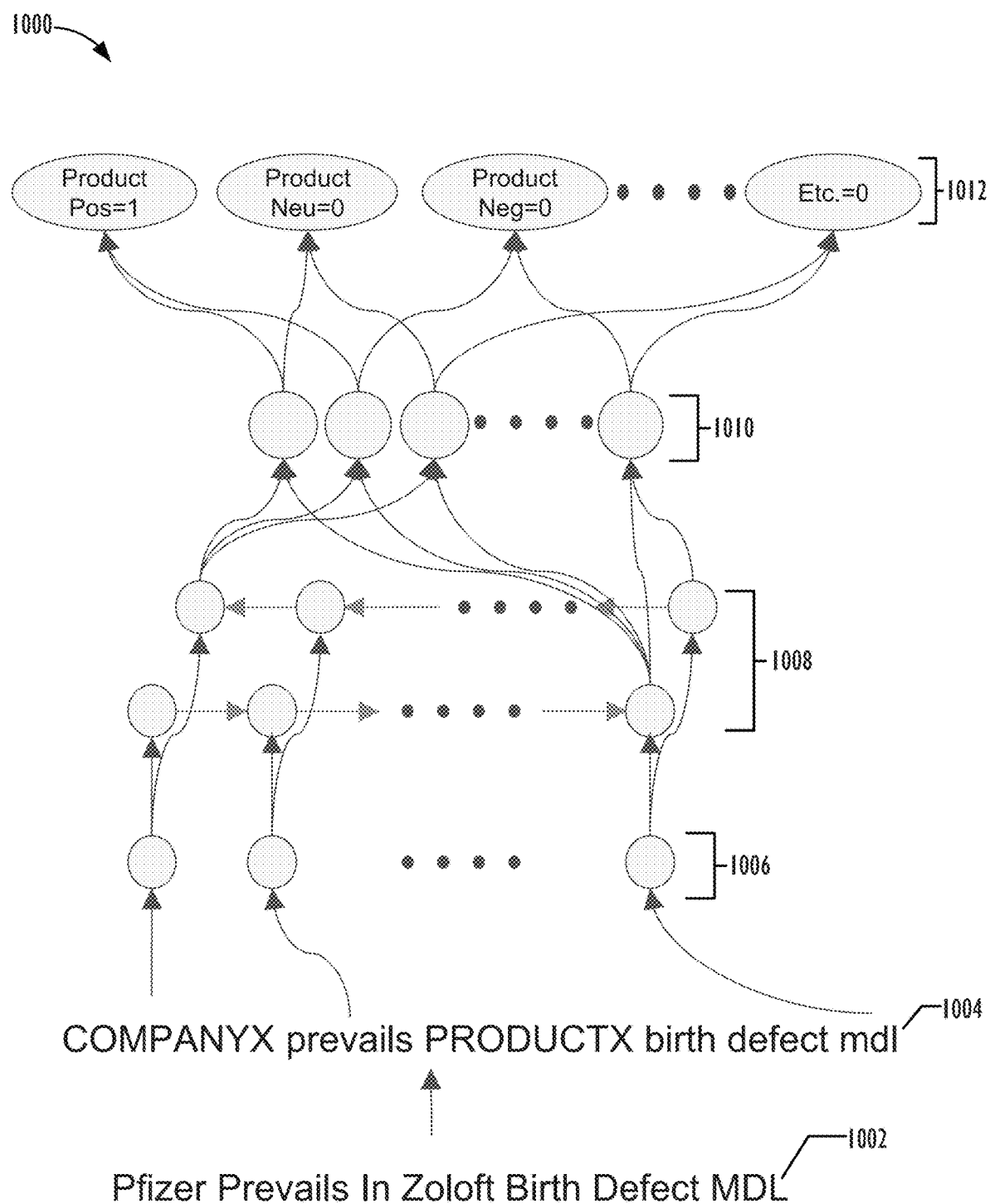
FIG. 10 illustrates an example neural network architecture, in accordance with aspects of the present disclosure.

FIG. 10 illustrates an example neural network architecture 1000, in accordance with aspects of the present disclosure. According to certain aspects, in this example of training data applied to the network, an original headline 1002 from an article in the article database may be "Pfizer Prevails in Zoloft Birth Defect MDL." This title is turned into its normalized representation 1004 "COMPANYX prevails COMPANYX birth defect mdl". A 300 dimensional vectorized representation 1006 of the normalized headline is input to the bidirectional long short-term memory (Bi-LSTM) nodes 1008 of the network which are connected to a hidden layer 1010. The hidden layer 1010 is connected to the output layer 1012, which is a one-hot vector where the category-valence chosen by the training user from the training database 156 for this article is given a value 1 and all other category-valence combinations are given a value 0. The weights of the network are adjusted immediately or in batches of articles in order to reduce the error in the network output. These network updates (and subsequent application to new data 212, 214) are sped up significantly by using a specialized neural network processor 110 such as a graphics processing unit (GPU) or a tensor processing unit (TPU) or other application specific integrated circuit designed for neural network processing.

Once trained, the weights and architecture are stored in memory 104. The trained model can be applied to unseen training data whose category-valence is known. Performance on these test data is approximately 88% recall and 88% precision as shown in TABLE 2.

TABLE 2

| Category-Valence | precision | recall | f1-score | support |
|---|---|---|---|---|
| ANALYST_NEG | 0.9 | 0.9 | 0.9 | 20 |
| ANALYST_NEU | 0.76 | 0.8 | 0.78 | 20 |
| ANALYST_POS | 0.94 | 0.8 | 0.86 | 20 |
| ATTACK-DISASTER_NEG | 0.95 | 1 | 0.98 | 20 |
| BANKRUPTCY_NEG | 0.75 | 0.6 | 0.67 | 20 |
| BANKRUPTCY_NEU | 0.67 | 0.8 | 0.73 | 20 |
| COMPETITION_NEG | 0.84 | 0.8 | 0.82 | 20 |
| COMPETITION_NEU | 0.9 | 0.95 | 0.93 | 20 |
| COMPETITION_POS | 0.79 | 0.75 | 0.77 | 20 |
| CONFERENCE_NUL | 0.95 | 1 | 0.98 | 20 |
| CRIME-WHITE_NEG | 0.91 | 1 | 0.95 | 20 |
| CRIME_NUL | 1 | 1 | 1 | 20 |
| CYBER_NEG | 0.87 | 1 | 0.93 | 20 |
| CYBER_NEU | 0.9 | 0.9 | 0.9 | 20 |
| CYBER_POS | 0.9 | 0.9 | 0.9 | 20 |

TABLE 2-continued

| Category-Valence | precision | recall | f1-score | support |
|---|---|---|---|---|
| EXECUTIVE-MOVEMENT_NEG | 0.85 | 0.85 | 0.85 | 20 |
| EXECUTIVE-MOVEMENT_NEU | 0.77 | 0.85 | 0.81 | 20 |
| EXECUTIVE-MOVEMENT_POS | 0.9 | 0.9 | 0.9 | 20 |
| EXECUTIVES-EX_NEU | 0.95 | 0.9 | 0.92 | 20 |
| EXECUTIVES_NEG | 0.86 | 0.9 | 0.88 | 20 |
| EXECUTIVES_NEU | 0.91 | 1 | 0.95 | 20 |
| EXECUTIVES_POS | 1 | 0.7 | 0.82 | 20 |
| EXPAND-CONTRACT_NEG | 0.89 | 0.85 | 0.87 | 20 |
| EXPAND-CONTRACT_NEU | 0.83 | 1 | 0.91 | 20 |
| EXPAND-CONTRACT_POS | 0.94 | 0.85 | 0.89 | 20 |
| FINANCES_NEG | 0.86 | 0.95 | 0.9 | 20 |
| FINANCES_NEU | 0.84 | 0.8 | 0.82 | 20 |
| FINANCES_POS | 0.82 | 0.9 | 0.86 | 20 |
| INSIDER-STOCK_NEG | 1 | 1 | 1 | 20 |
| INSIDER-STOCK_POS | 1 | 1 | 1 | 20 |
| IP_NEG | 1 | 0.85 | 0.92 | 20 |
| IP_NEU | 0.95 | 0.95 | 0.95 | 20 |
| IP_POS | 0.86 | 0.9 | 0.88 | 20 |
| LABOR_NEG | 0.9 | 0.9 | 0.9 | 20 |
| LABOR_NEU | 0.85 | 0.85 | 0.85 | 20 |
| LABOR_POS | 0.95 | 0.9 | 0.92 | 20 |
| MARKETING_NUL | 0.95 | 1 | 0.98 | 20 |
| MnA_NEG | 0.95 | 0.95 | 0.95 | 20 |
| MnA_NEU | 0.9 | 0.95 | 0.93 | 20 |
| MnA_POS | 0.95 | 0.95 | 0.95 | 20 |
| NON-ENGLISH_NUL | 1 | 0.9 | 0.95 | 20 |
| NON-TARGET_NUL | 1 | 0.7 | 0.82 | 20 |
| PARTNERSHIP_NEG | 0.9 | 0.95 | 0.93 | 20 |
| PARTNERSHIP_NEU | 0.92 | 0.55 | 0.69 | 20 |
| PARTNERSHIP_POS | 0.78 | 0.9 | 0.84 | 20 |
| POLITICS_NEG | 0.79 | 0.95 | 0.86 | 20 |
| POLITICS_NEU | 0.86 | 0.9 | 0.88 | 20 |
| POLITICS_POS | 1 | 1 | 1 | 20 |
| PRODUCT_NEG | 0.85 | 0.85 | 0.85 | 20 |
| PRODUCT_NEU | 0.55 | 0.55 | 0.55 | 20 |
| PRODUCT_POS | 0.57 | 0.6 | 0.59 | 20 |
| PUBLICITY_NEG | 0.73 | 0.8 | 0.76 | 20 |
| PUBLICITY_NEU | 0.94 | 0.85 | 0.89 | 20 |
| PUBLICITY_POS | 0.77 | 0.85 | 0.81 | 20 |
| RECALL_NEG | 1 | 1 | 1 | 20 |
| REGULATION_NEG | 0.81 | 0.65 | 0.72 | 20 |
| REGULATION_NEU | 0.8 | 0.8 | 0.8 | 20 |
| REGULATION_POS | 0.86 | 0.9 | 0.88 | 20 |
| SALES_NEG | 0.85 | 0.85 | 0.85 | 20 |
| SALES_NEU | 0.95 | 0.9 | 0.92 | 20 |
| SALES_POS | 0.89 | 0.85 | 0.87 | 20 |
| SHAREHOLDERS_NEG | 0.95 | 0.95 | 0.95 | 20 |
| SHAREHOLDERS_NEU | 0.95 | 1 | 0.98 | 20 |
| SHAREHOLDERS_POS | 1 | 0.95 | 0.97 | 20 |
| SPAM_NUL | 0.9 | 0.9 | 0.9 | 20 |
| STOCK_NEG | 0.86 | 0.95 | 0.9 | 20 |
| STOCK_NEU | 0.8 | 0.6 | 0.69 | 20 |
| STOCK_POS | 0.9 | 0.95 | 0.93 | 20 |
| SUPPLY-CHAIN_NEG | 0.95 | 1 | 0.98 | 20 |
| SUPPLY-CHAIN_POS | 0.91 | 1 | 0.95 | 20 |
| TAXES_NEG | 0.87 | 1 | 0.93 | 20 |
| TAXES_NEU | 0.83 | 0.95 | 0.88 | 20 |
| TAXES_POS | 0.88 | 0.75 | 0.81 | 20 |
| avg/total | 0.88 | 0.88 | 0.88 | 1460 |

Figure 11:
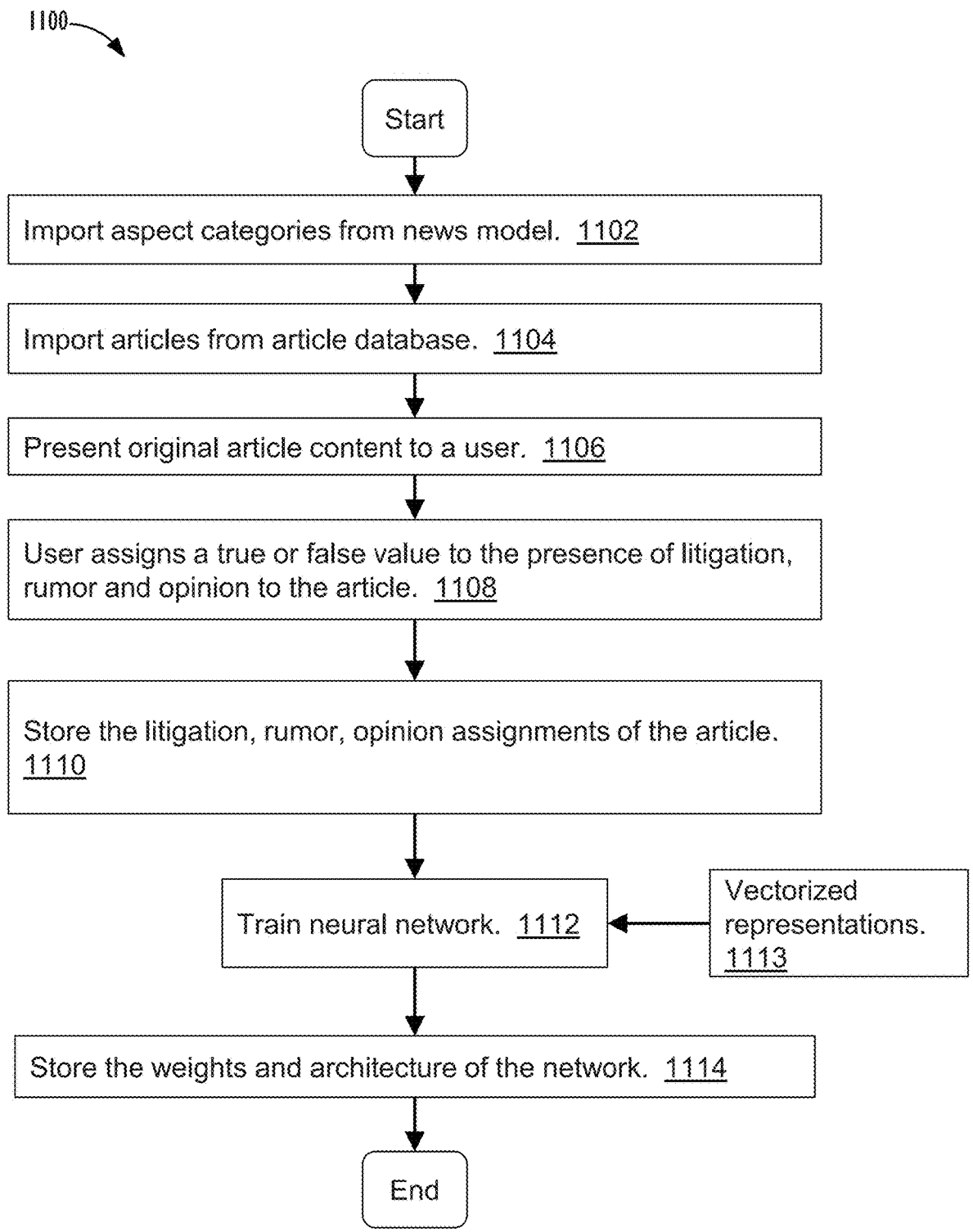
FIG. 11 illustrates an example process for creating an aspect analysis engine, accordance with aspects of the present disclosure.

FIG. 11 illustrates an example process 1100 for creating an aspect analysis engine, in accordance with aspects of the present disclosure. At block 1102, aspect categories from the news model 132 are imported. At block 1104, articles from the article database 112 are imported. At block 1106 the data are presented to a training user in a training user interface 160 using a similar interface as that shown in FIG. 8. At block 1108, the training user designates true or false for each aspect category and at block 1110, these designations are stored in the training data database 156. A neural network is trained at block 1112 with the aspects assignments as output and the vectorized representations 1113 of the articles as input. For example, for articles with an aspect assignment, weights in a neural network may be adjusted with the vectorized representation of the article as input and the combination of the aspects as the output. At block 1114, the resulting weights are stored.

Figure 12:
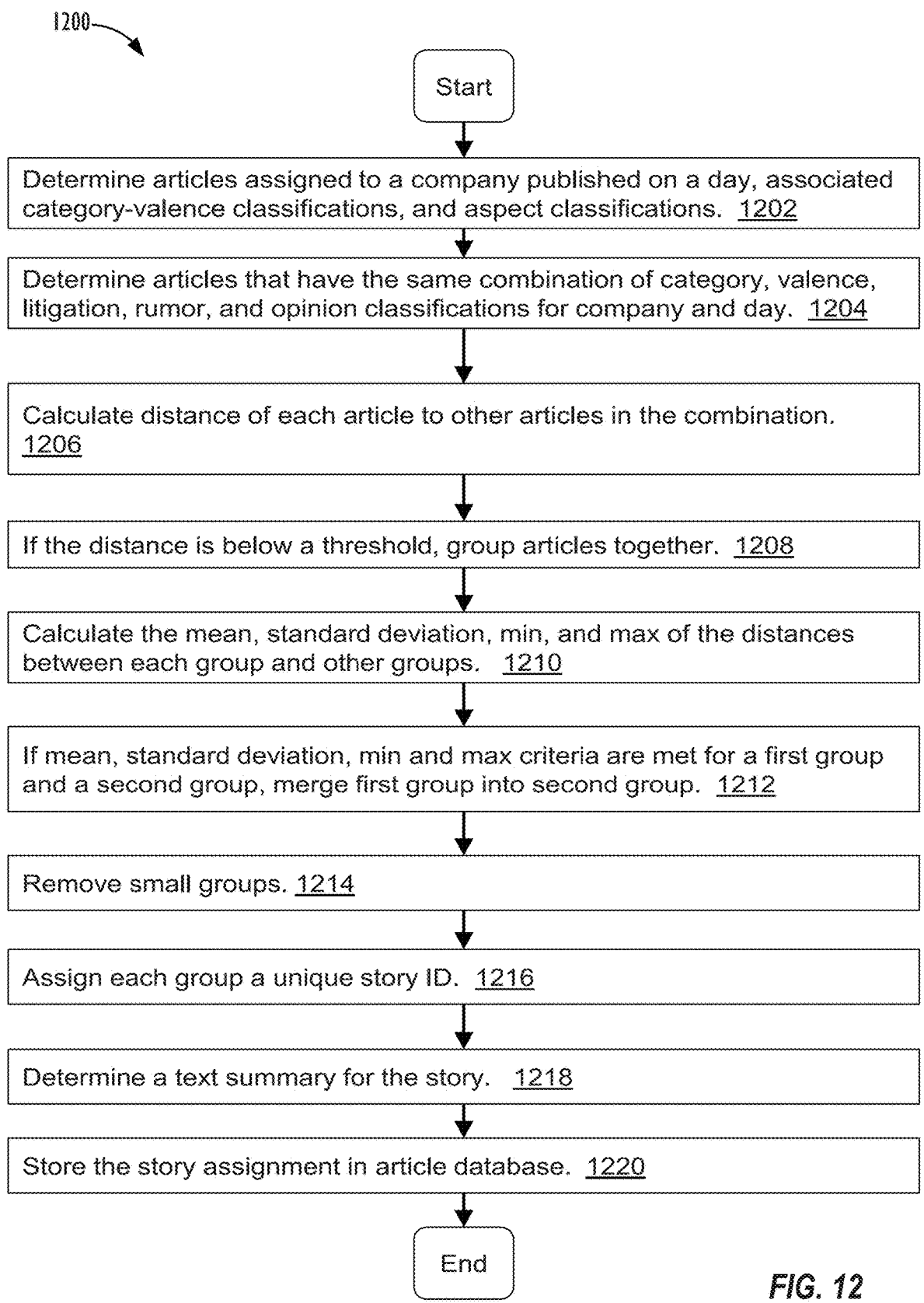
FIG. 12 illustrates an example process for assigning articles to a story, in accordance with aspects of the present disclosure.

FIG. 12 illustrates an example process 1200 for assigning articles to a story, in accordance with aspects of the present disclosure. With the articles classified in block 516, articles may be grouped into stories and storylines. In certain cases, this may be performed by the story-storyline analysis engine 142. At block 1202, all articles assigned to a given target company and published on a given day are determined, along with associated category-valence classifications and aspect classifications. At block 1204, each combination of aspect, category, and valence classifications, a subset of the articles matching that combination are determined. At block 1206, a distance of each article to each other article of the subset of articles is calculated. According to certain aspects, the distance of two articles may be calculated using the Word Mover's Distance algorithm as described in Kusner, M., Sun, Y., Kolkin, N., & Weinberger, K., From Word Embeddings To Document Distances, Proceedings of the 32nd International Conference on Machine Learning, PMLR 37:957-966 (June 2015). The Word Mover's Distance algorithm uses the vectorized representations of the articles to calculate the distance between two articles. The computations in this algorithm are complex and the problem scales $O(w^3 \log w)$ in the number of unique words in the two documents. However, due to the classification of the articles and the restriction to just a small number of articles for a given company on a given day in a particular category-valence-aspect combination, the number of comparisons is miniscule relative to the overall size of the corpus of articles.

At block 1208, if the distance between two articles is below a certain threshold, then the two articles are grouped together. If an article is near another article that has already been grouped, then the article joins that group. At block 1210, a mean, standard deviation, min, and max distances are determined as between the groups. At block 1212, the mean, standard deviation, min, and max distances may be compared against certain threshold criteria, and if these threshold criteria are met, then groups may be merged together. At block 1214, groups may be compared against a threshold size and small groups may be removed. For example, a company may have a large volume of articles published about the company very often and if a certain event is mentioned below a threshold number of times, the event is likely insignificant and those groups may be removed. At block 1216, remaining groups are assigned a unique story ID number. At block 1218, a textual summary is created for the group of articles. At block 1220, the story is stored in the article database 112 and each of the individual articles are updated with the story ID.

Figure 13:
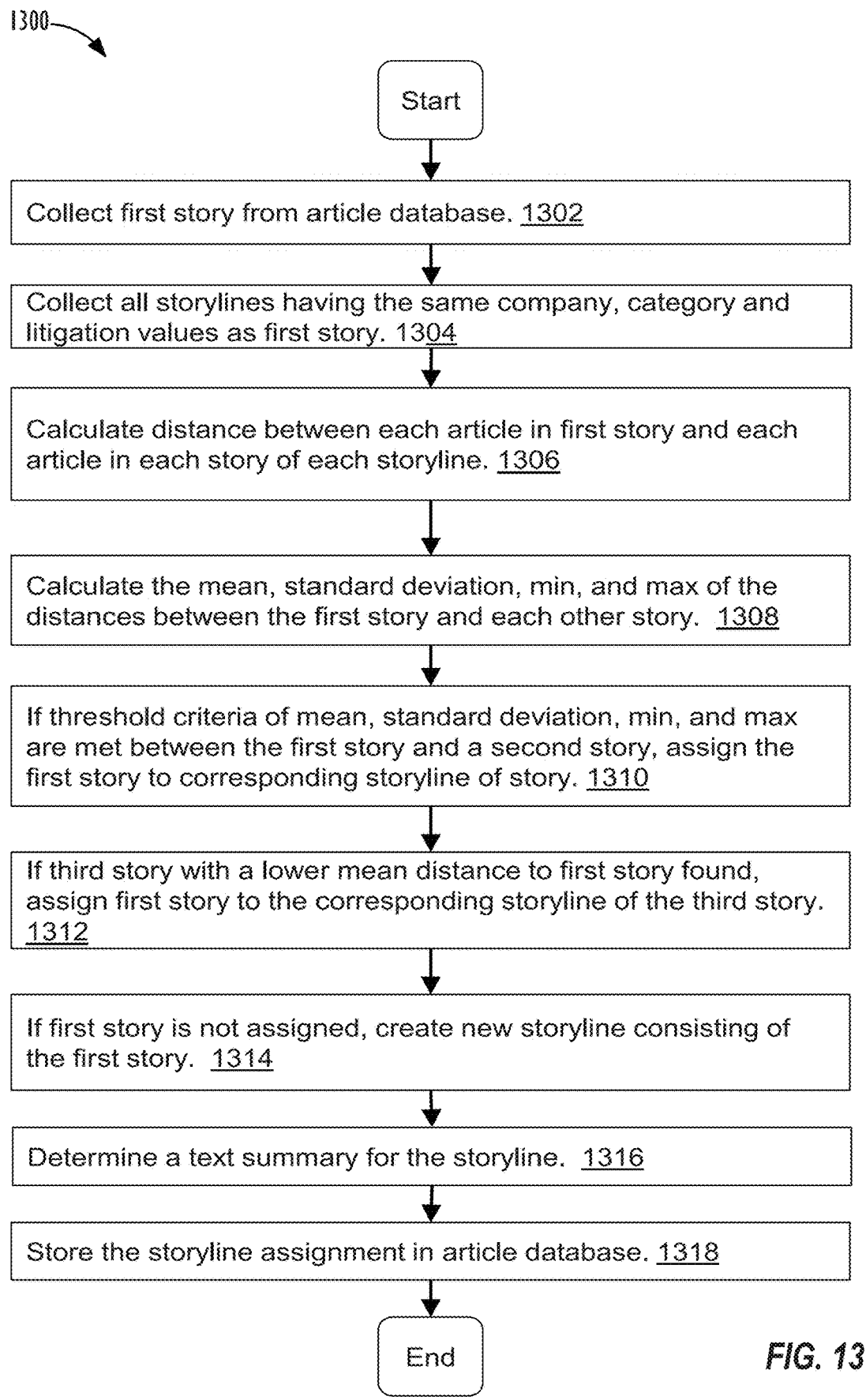
FIG. 13 illustrates an example assignment of a story to a storyline, in accordance with aspects of the present disclosure.

FIG. 13 illustrates an example assignment of a story to a storyline 1300, in accordance with aspects of the present disclosure. At block 1302, a first story is retrieved from the article database. At block 1304, all storylines having the same company, category and litigation values as the first story are determined. At block 1306, a distance between each article in the first story and each article in each story of each storyline is determined. According to certain aspects, the distance of two articles may be calculated using the Word Mover's Distance algorithm. In certain cases, the distance calculation may be performed by the similarity engine 144. At block 1308, a mean, standard deviation, min, and max of the distances between the first story and each other story is calculated. At block 1310, if certain threshold criteria of the mean, standard deviation, min, and max are met as between the first story and a second story then the first story is assigned to a corresponding storyline associated with the second story. At block 1312, if a third story matches the criteria and has a lower mean distance, then the first story is reassigned to a corresponding storyline associated with the third story. At block 1314, if after all comparisons, the first story is not assigned, then a new storyline is created with just the first story with a unique ID. At block 1316, a text summary is created for the storyline. At block 1318, the assignment of the story to the storyline is then stored in the article database.

Figure 14:
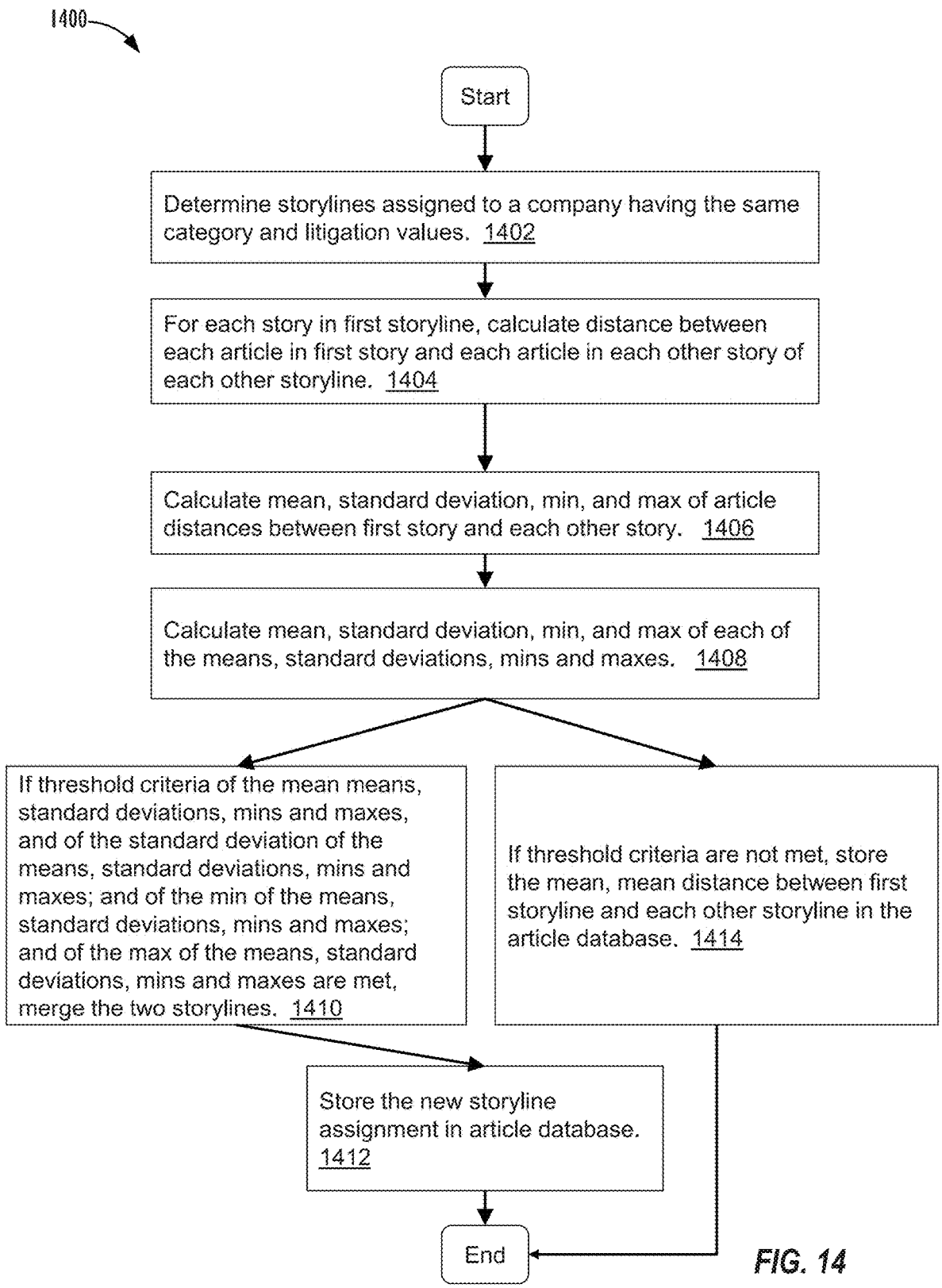
FIG. 14 illustrates an example process for further storyline merging, in accordance with aspects of the present disclosure.

In certain cases, assigning articles to a story and assigning the story to a storyline may not adequately pull together all articles into stories and storylines, and further merging may be needed. FIG. 14 illustrates an example process 1400 for further storyline merging, in accordance with aspects of the present disclosure. At block 1402, for a given a company, storylines having the same category and litigation values are determined. At block 1404, for each story in a first storyline, a distance between each article in a first story and each article in a second story of each of the other storylines are calculated. According to certain aspects, the distance of two articles may be calculated using the Word Mover's Distance algorithm. At block 1406, a mean, standard deviation, min, and max of article distances as between the first story and each other story is determined. At block 1408, for the first storyline and each other storyline, the mean, standard deviation, min, and max of the values from block 1406 are determined for each story. At block 1410, where certain threshold criteria are met for these 16 statistics (the mean, standard deviation, min and max of each of the means, standard deviations, mins and maxes of the stories), then stories of the first storyline are assigned to another storyline. At block 1412, new storyline assignments are stored in the article database 112. At block 1414, where threshold criteria as between two storylines are not met, then the mean, mean distance of the storylines is stored in the article database. These data can be used as a similarity value, e.g., for showing a user related storylines which are not similar enough to be called the same storyline.

Figure 15:
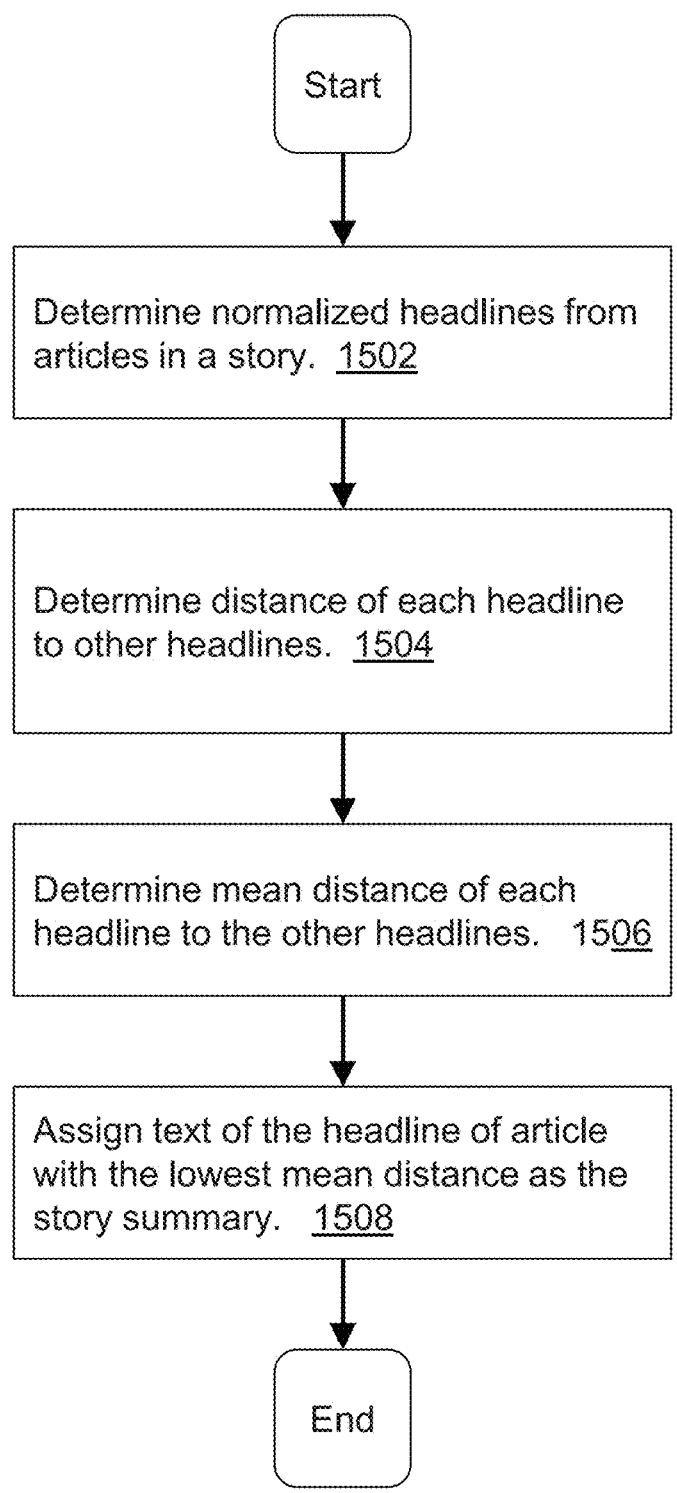
FIG. 15 illustrates an example process for creating a summary for a story, in accordance with aspects of the present disclosure.

FIG. 15 illustrates an example process for creating a summary 1500 for a story, in accordance with aspects of the present disclosure. At block 1502, normalized headlines from all articles in a story are determined. At block 1504, a distance of each headline to each other headline is calculated. According to certain aspects, the distance of two articles may be calculated using the Word Mover's Distance algorithm. At block 1506, a mean distance of each headline to all other headlines is calculated. At block 1508, original text of the headline with the lowest mean distance is assigned as the summary of the story and updated in the article database.

Figure 16:
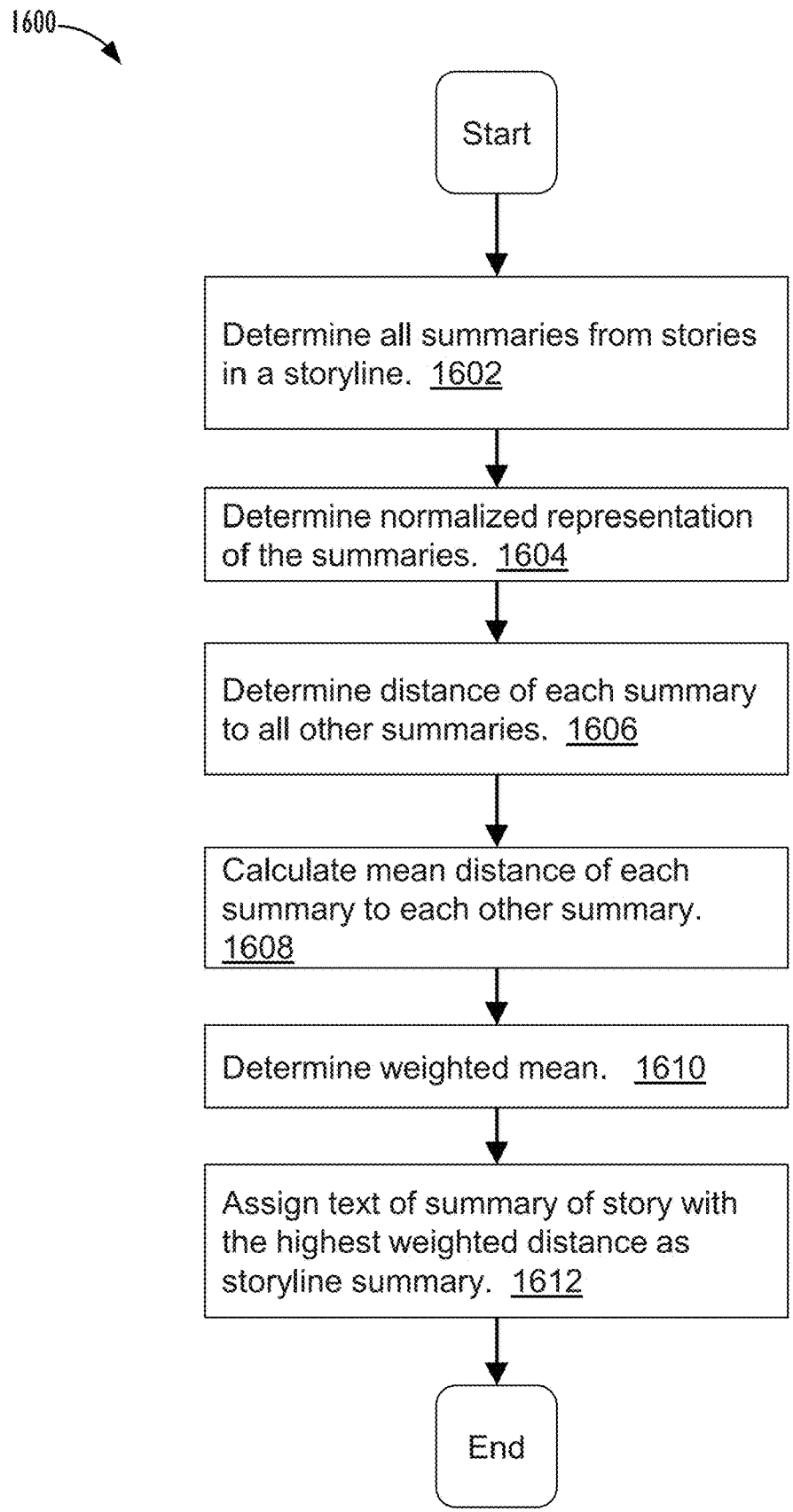
FIG. 16 illustrates an example process for creating a summary for a storyline, in accordance with aspects of the present disclosure.

FIG. 16 illustrates an example process for creating a summary 1600 for a storyline, in accordance with aspects of the present disclosure. At block 1602, all summaries from stories in a storyline are collected. At block 1604, normalized representations of the summaries are created. At block 1606, based on the vectorized representations of the normalized representations, a distance of each summary to each other summary is calculated. At block 1608, mean distances of each summary to each other summary are calculated. At block 1610, a weighted mean distance is determined equal to the number of articles multiplied by a weight factor. According to certain aspects, the weight factor may comprise 1.0 minus the distance. At block 1612, text of the summary of the story with the highest weighted distance is used as the summary of the storyline and stored in the article database.

According to certain aspects, creating a summary of a story or storyline may be based on extractive text summarization as described in Erkan, G., & Radev, D. R., Lexrank: Graph-Based Lexical Centrality as Salience in Text Summarization, Journal of Artificial Intelligence Research, 22, 457-479 (2004). In other cases, attentional recurrent neural networks may be used to generate summaries from the full text of the articles as described in Nallapati, R., Zhou, B., Gulcehre, C., & Xiang, B., Abstractive Text Summarization Using Sequence-to-Sequence RNNS and Beyond, arXiv, 1602.06023 (2016) available at https://arxiv.org/abs/1602.06023.

Once all articles have been assigned a category and a valence, other processes may be performed. For example, a health score can be calculated given any collection of classified articles. An example health score is as follows:
1. Pos=the number of positive articles
2. Neg=the number of negative articles
3. Neu=the number of neutral articles
4. min(a,b)=a function returning the lesser of a or b
5. Health Score=((Pos−Neg)/(Pos+Neg+Neu))*10.0* (min(1.0, (Pos+Neg+Neu)/100.0))

The health score can range from −10 to +10, but the range is reduced as the number of articles falls below, for example, 100 or as the number of neutral articles increases. The set of articles going into the counts could be limited by time, by health category, or health factor.

Based on the health score, health factor, or health category, different companies can be compared. For example, a user might want to sort the companies they are following by who has the worst product or public sentiment score (perhaps due to a product recall, or a public outcry about higher prices). If certain companies having a relatively low product or public sentiment score are not currently clients, then the use may identify those companies to reach out to, and in what order.

Figure 17:
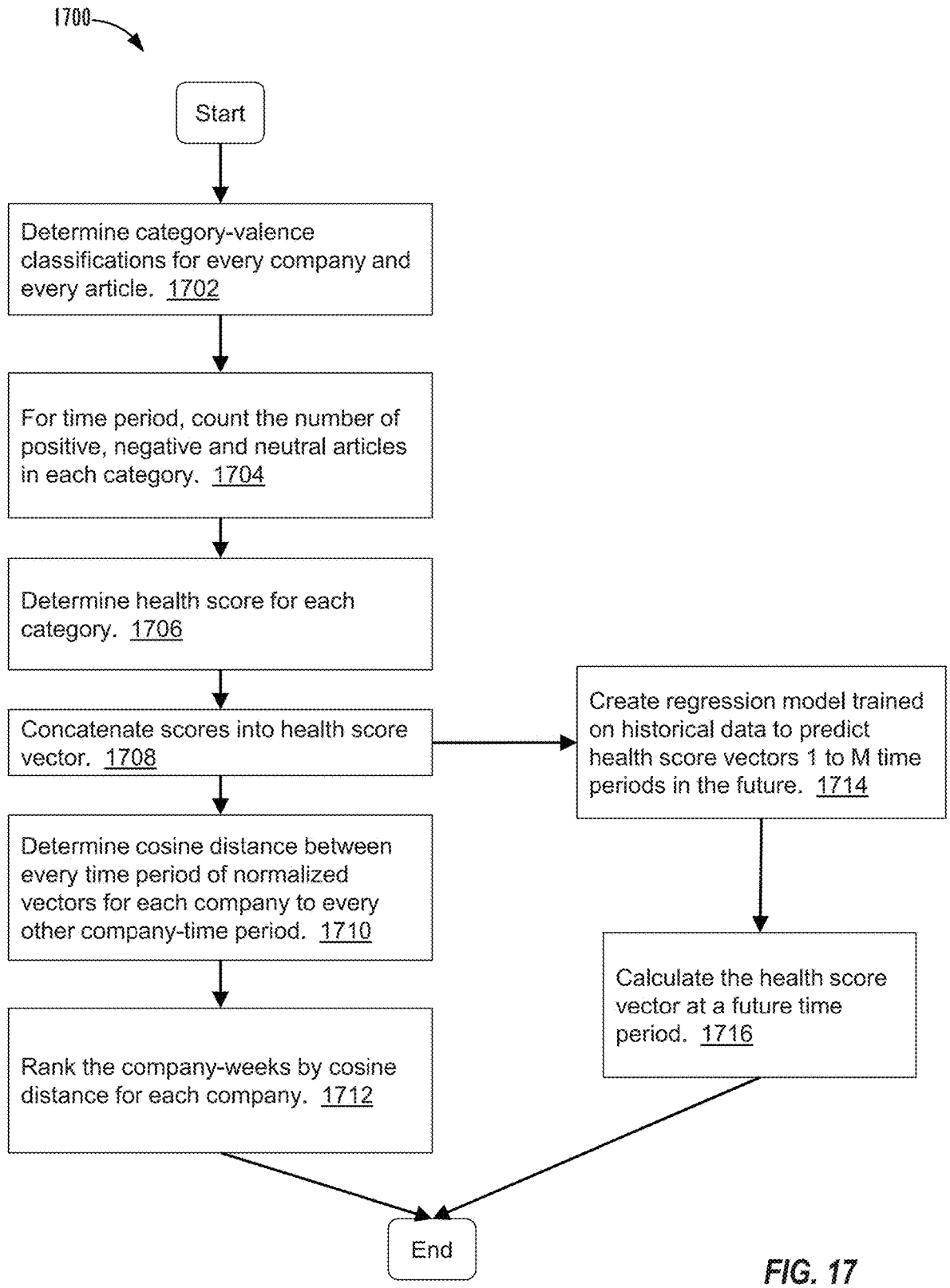
FIG. 17 illustrates an example process for similar circumstance discovery, in accordance with aspects of the present disclosure.

As another example, another way companies may be compared is given the recent news from one company, other companies that have been in similar circumstances may be discovered. FIG. 17 illustrates an example process for similar circumstance discovery 1700, in accordance with aspects of the present disclosure. At block 1702, category and valence classifications are determined for each article and for every company. At block 1704, for a given current period of time, a number of positive, neutral, or negative articles for each category is counted. At block 1706, a health score is calculated for each category over the current time period. At block 1708, the health scores across the categories can be concatenated to form a health score vector. At block 1710, a cosine distance between a given company's health score vector for the current time period and that of every other company's for a similar second time period is calculated. According to certain aspects the second time period may be similar in length to the current time period, but may not be contemporaneous with the current time period. At block 1712, these scores are then ranked to indicate which company, at the second time period, was the most similar to the current company's current time period. More than one week's worth of data may go into the health score, or multiple weeks' vectors might be concatenated before calculating the cosine distance.

The health score vectors from block 1708 can also be used for predicting future health score vectors, such as a potential valence of each category at some point in the future. At block 1714, a multiple linear regression model may be trained on historical data with a health score vector over a time period as the input, and an upcoming time period vector as the output. The multiple linear regression model may be run, for example, via the category-valence analysis engine 136. At block 1716, the trained model may then be used to predict the future health score vector at future time on an ongoing basis. Different time periods, or sets of time periods may be used as both input and output. According to certain aspects, the health score vectors are used as input to a recurrent neural network of the temporal relationships between these categories. This model outputs a probability of the valence of each category at some future point. Techniques may be used similar to those used in Estimating Rainfall From Weather Radar Readings Using Recurrent Neural Networks, Github.io, available at http://simaaron-.github.io/Estimating-rainfall-from-weather-radar-readings-using-recurrent-neural-networks/; see also Pascanu, Razvan, Caglar Gulcehre, Kyunghyun Cho, & Yoshua Bengio, How to Construct Deep Recurrent Neural Networks, arXiv: 1312.6026 [Cs, Stat] (Dec. 20, 2013) available at http://arxiv.org/abs/1312.6026. According to certain aspects, separate models may be built for different periods in the future. For example, a model may be trained to predict the max daily valence for a health category for 1-7 days ahead, another model for 8-14 days ahead, etc. According to certain aspects, the vectorized representations of individual articles are used as input into one or more of these models.

Figure 18:
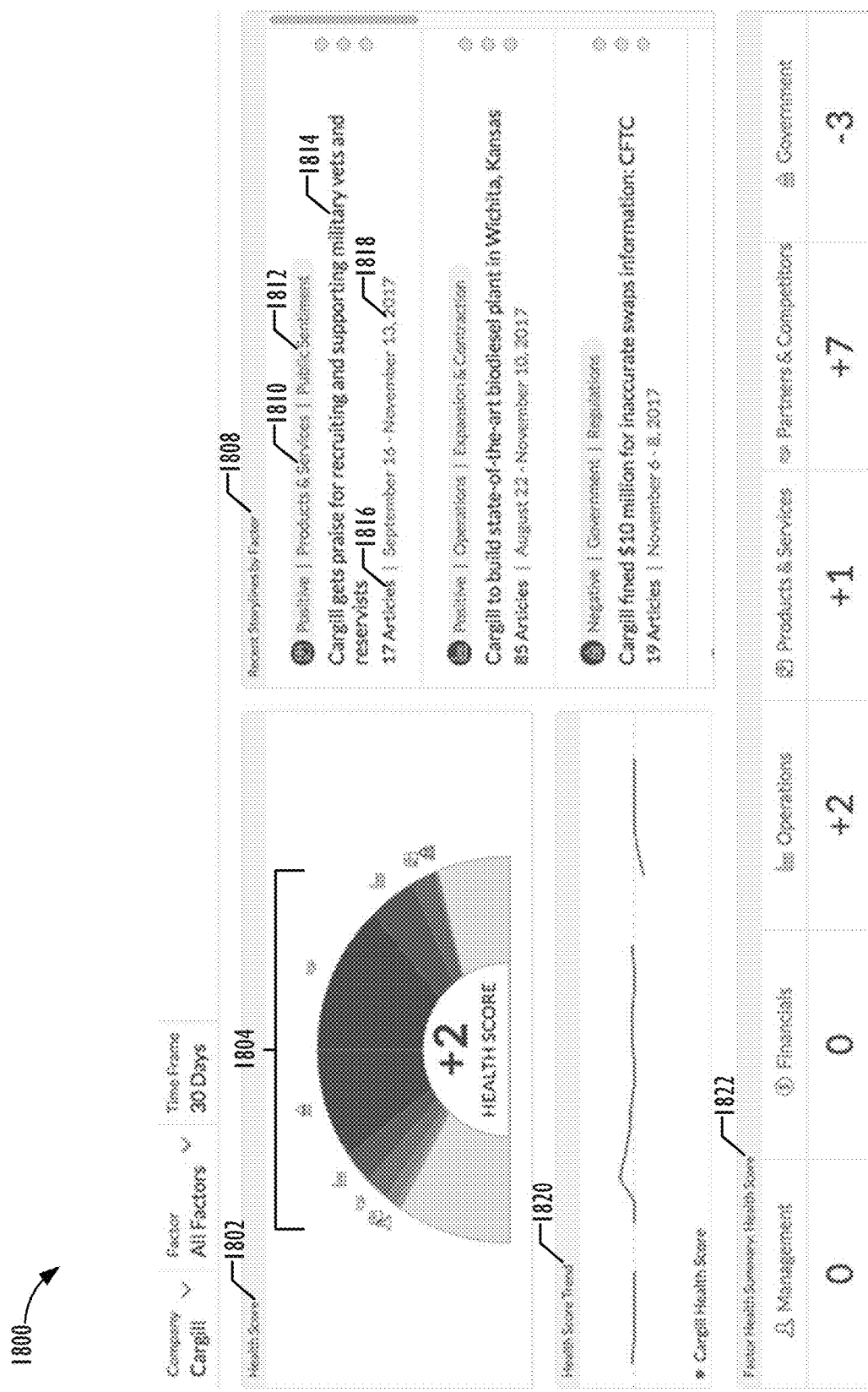
FIG. 18 illustrates an example company overview UI, in accordance with aspects of the present disclosure.

FIG. 18 illustrates an example company overview UI 1800, in accordance with aspects of the present disclosure. The news analysis system UI may include a company overview UI. In this example, an overall health score 1802 may be displayed, and the volume of articles in each factor indicated by the size of the wedges 1804 with positive valence to right and negative to the left. Recent storylines by factor 1808 are shown along with an indication of the health factor 1810, health subfactor 1812, the summary 1814 created for the storyline, the total number of articles 1816 and the span of time 1818 for which there are stories in the storyline. The health score trend 1820 shows the overall health over the last 30 days, where days with no news are shown as blank. The health scores for each individual factor 1822 may also be displayed. This user interface allows a user to quickly get up to speed on the issues affecting this company.

Figure 19:
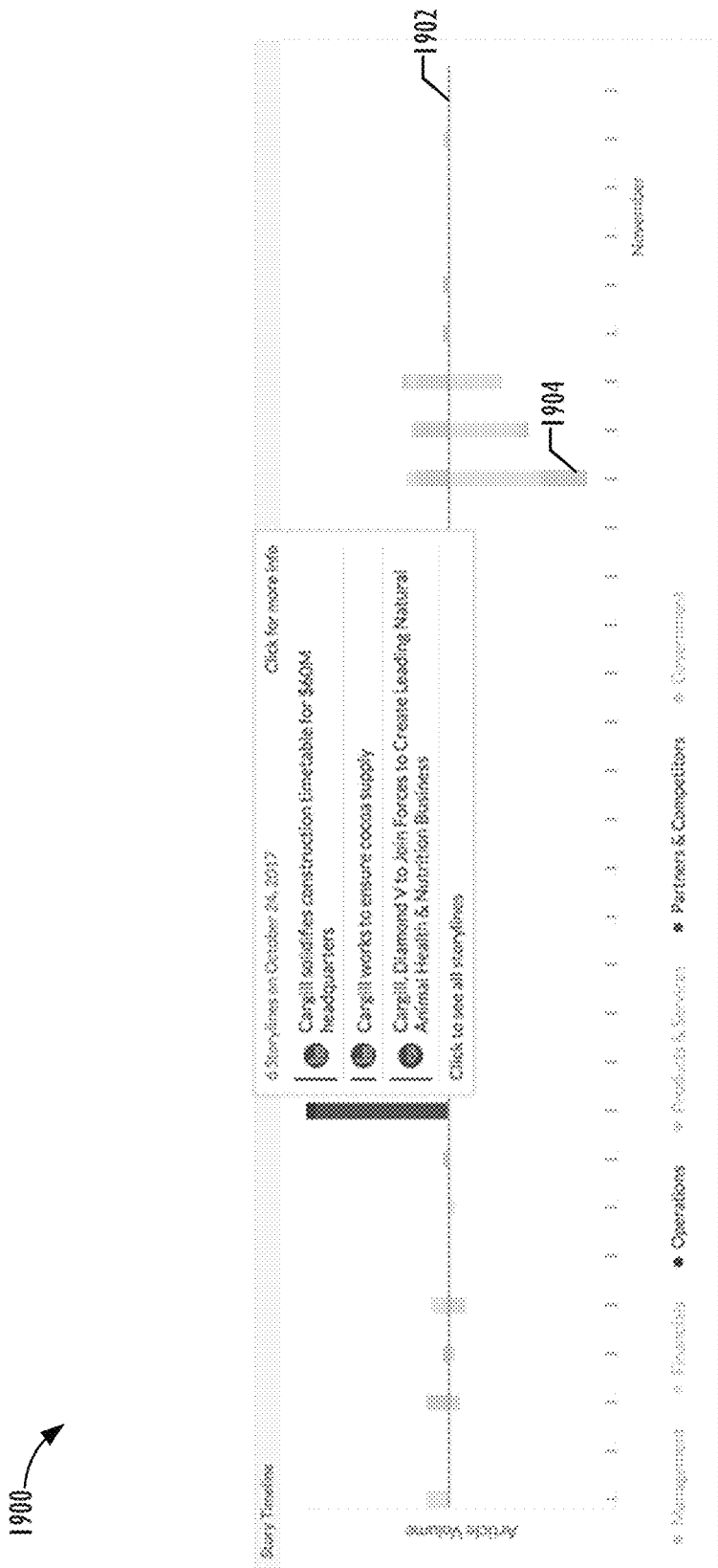
FIG. 19 illustrates an example story timeline UI, in accordance with aspects of the present disclosure.

FIG. 19 illustrates an example story timeline UI 1900, in accordance with aspects of the present disclosure. Each health factor is represented by a different color and bars are above the midline 1902 if a story is positive and below the midline if negative. The size of the bar is relative to the volume of articles in the story. A hover interaction on a bar brings up the storylines containing the stories on that day, along with their summaries. In this example, while overall health is positive, there are indications that there was some significant negative news 1904 starting in late October.

Figure 20:
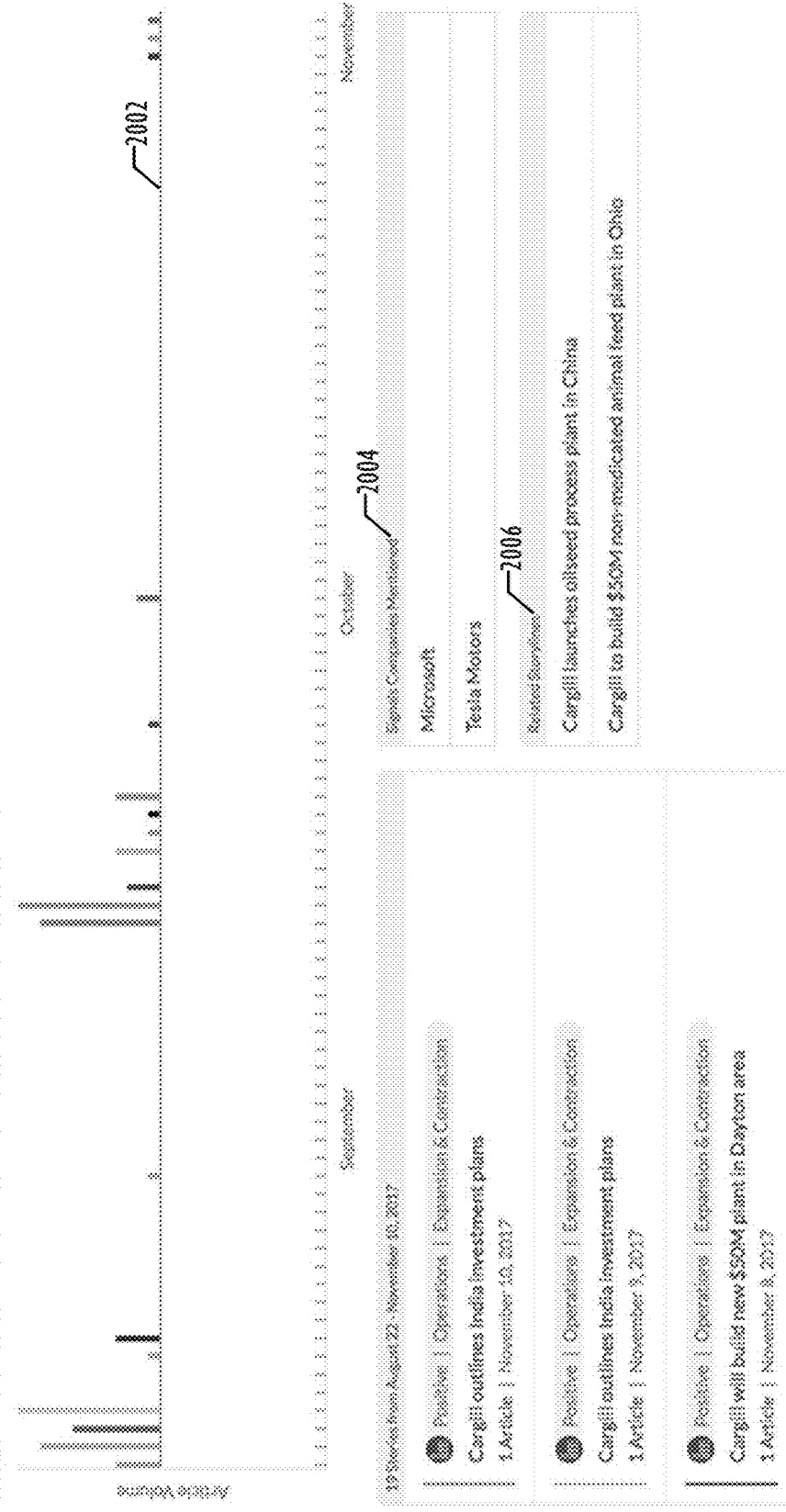
FIG. 20 illustrates an example storyline user interface, in accordance with aspects of the present disclosure.

FIG. 20 illustrates an example storyline user interface 2000, in accordance with aspects of the present disclosure. The timeline 2002 shows the volume of stories each day over the total span of the storyline. In this example, the storyline concerns creating or investing in new processing plants (only the most recent few are seen in the figure). Other companies 2004 besides the target company that are mentioned in the same articles may be shown. Storylines that were not merged 2006 but have a low enough mean distance to the current storyline may also be shown. The storyline may indicate to a user that this company is steadily expanding and may be in need of professional services related to mergers and acquisitions.

Figure 21:
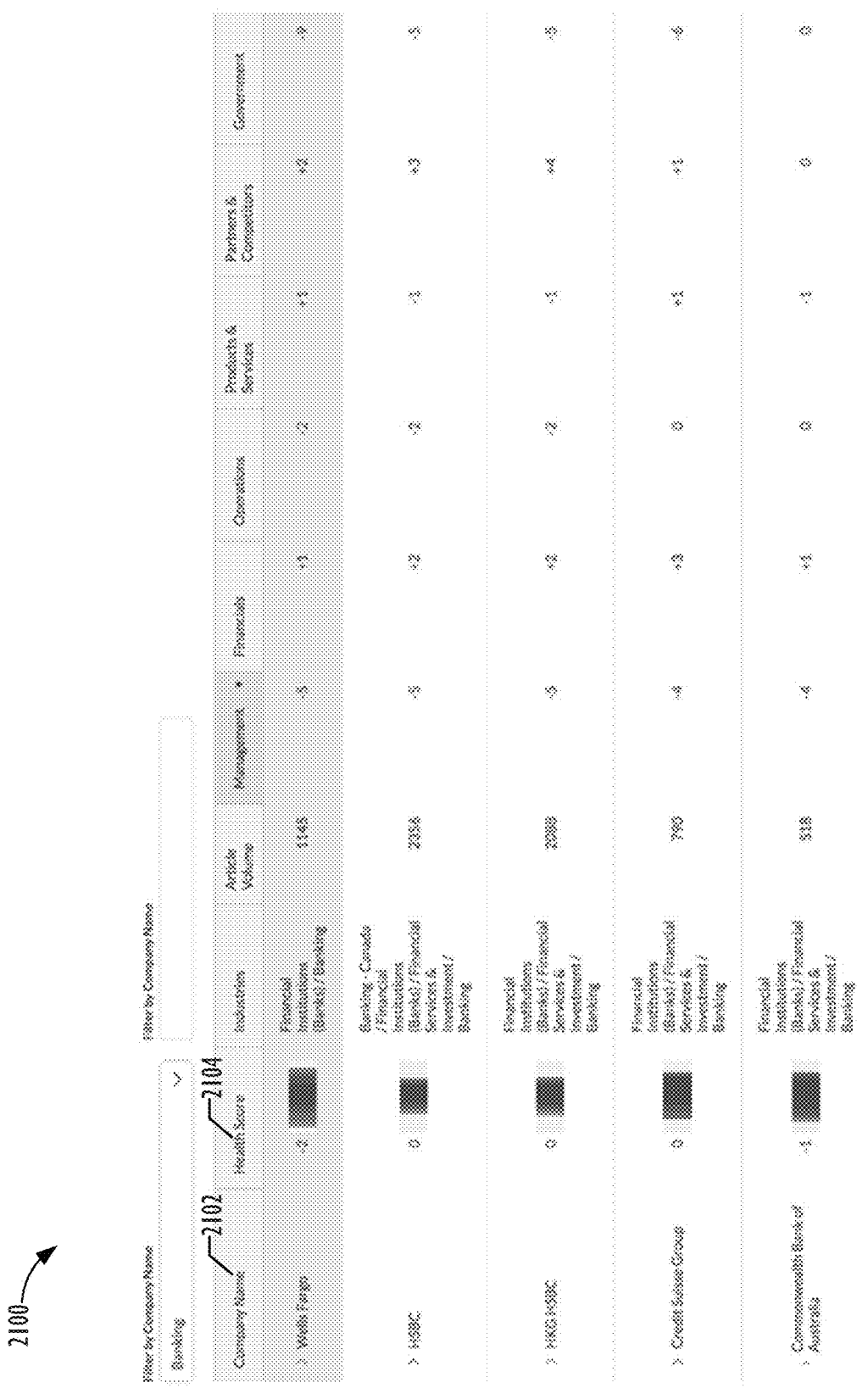
FIG. 21 illustrates an example company comparison user interface, in accordance with aspects of the present disclosure.

FIG. 21 illustrates an example company comparison user interface 2100, in accordance with aspects of the present disclosure. As shown, displayed companies 2102 may be filtered by their industry, in this case banking. Further sorting based on a sortable management health score 2104 may also be available. Companies most likely to need services related to the management health factor may be determined based on this sorting.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A system for news classification, comprising:
  one or more non-transitory physical media; and
  one or more hardware processors configured to execute instructions from the one or more non-transitory physical media to cause the system to:
    receive an article, the article including text;
    extract text from the received article;
    store the extracted text in a database;
    determine a set of target entities based on the extracted text;
    determine, by a classification module trained to classify articles based on a news model, a classification of the article for one of the target entities of the set of target entities for a category, valence, presence of litigation, rumor, or opinion based on the extracted text, wherein the classification comprises classifying text relating to the one of the target entities with respect to each of the other target entities, such that said classification assesses the one of the target entity's relational health with respect to each of the other target entities, wherein the news model includes one or more of the following: one or more news categories, a valence associated with the category, a litigation indicator, and a rumor or opinion indicator;
    associate the determined classification of the article, along with a probability of the determined classification of the article for the one of the target entities;
    assign the determined classification of the article if the probability of the determined classification is greater than a threshold criteria; and
    store the associated determined classification of the article and the probability of the determined classification.

2. The system of claim 1, wherein the instructions from the one or more non-transitory physical media to cause the system to determine the classification by:
- determining a probability for each category of the news model;
- determining a probability of the valence for each news category of the news model;
- determining a probability of litigation for the one of the target entities;
- determining a probability of a rumor for the one of the target entities; and
- determining a probability of an opinion for the one of the target entities.

3. The system of claim 1, wherein entities of the set of target entities comprises at least one of a company, an industry, a geographical region, an item of entertainment, or an individual.

4. The system of claim 1, wherein the category is selected from a set of categories, the categories of the set of categories selected based on potential interactions of the target entities.

5. The system of claim 1, wherein the valence indicates whether the article is positive, negative, or neutral with respect to the one of the target entities and wherein instructions from the one or more non-transitory physical media further cause the system to assign a score to the one of the target entities based on a count of a number of positive, negative, and neutral articles for the one of the target entities for a time period.

6. The system of claim 1, wherein the classification module comprises a neural network.

7. The system of claim 6, wherein the neural network is trained based on a set of preassigned articles, wherein the classification of the article is further based on metadata associated with the article, and metadata associated with the one of the target entities.

8. The system of claim 6, wherein the neural network comprises at least one of a long short-term memory, bi-directional long short-term memory, or convolutional neural network.

9. The system of claim 1, wherein the instructions from the one or more non-transitory physical media further cause the system to:
- group the article with one or more other articles based on the determined classification;
- determine a representative story summary for the grouped articles;
- determine a health score associated with the grouped articles based on the valence; and
- transmit for display by a graphical user interface a report for a target entity, the report including the representative storyline summary, health score, and information related to the grouping of the articles.

10. A system for news classification, comprising:
- one or more non-transitory physical media, the memory non-transitory physical media including:
  - a set of articles, the articles classified for a set of target entities for a category, valence, presence of litigation, rumor, or opinion, wherein the classification comprises classifying text relating to one of the target entities with respect to each of the other target entities, such that said classification assesses the one of the target entity's relational health with respect to each of the other target entities; and
  - a news model including one or more news categories, a valence associated with the category, a litigation indicator, and a rumor or opinion indicator; and
- one or more hardware processors configured to execute instructions from the one or more non-transitory physical media to cause the system to:
  - group a first article with a second article to form a story based on a distance between the first article and the second article, wherein each article of the story has the same category, valence, presence of litigation, rumor and opinion assignments;
  - group the story with another story into a storyline based on a distance between the first article and each article of the another story, wherein each article of the storyline has the same category and litigation designations;
  - determine a magnitude of the first story based on a number of articles assigned to the first story;
  - determine a story summary;
  - determine a storyline summary; and
  - transmit for display on a graphical user interface the determined storyline summary, the first story summary, and the magnitude of the first story.

11. The system of claim 10, wherein the distance between the first and second article is determined based on at least one of a word mover's algorithm, a Levenshtein algorithm, or a Ratcliff/Obershelp algorithm.

12. The system of claim 10, wherein the story summary is determined based on the most frequent article headline of articles in the first story.

13. The system of claim 10, wherein the story summary is determined based on a comparison of a first mean distance of a first headline of the article to a second mean distance of a second headline of the second article, and wherein the storyline summary is based on a comparison of a third mean distance of the story summary and a fourth mean distance of another story summary.

14. The system of claim 10, wherein the story summary is determined based on a separately trained neural network and text associated with the articles assigned to the story.

15. The system of claim 10, wherein entities of the set of target entities comprises at least one of a company, an industry, a geographical region, an item of entertainment, or an individual.

16. A system for news analysis, comprising:
- one or more non-transitory physical media, the memory non-transitory physical media including:
  - a set of articles, the articles classified for a set of target entities for a category, valence, presence of litigation, rumor, or opinion, wherein the classification comprises classifying text relating to a first target entity with respect to each of the other target entities, such that said classification assesses the first target entity's relational health with respect to each of the other target entities;
  - a news model including one or more news categories, a valence associated with the category, a litigation indicator, and a rumor or opinion indicator; and
- one or more hardware processors configured to execute instructions from the one or more non-transitory physical media to cause the system to:
  - receive, for the first target entity, fora first time period, designated valence, and designated category;
  - determine a number of positive, neutral, or negative articles for each category;
  - determine a health score based on the number of positive, neutral, or negative articles for each category;
  - generate a health score vector based a concatenation of the health scores for each category;

compare the health score vector to other health score vectors determined for the first target entity of the set of target entities for an associated second time period;

determine a second target entity based on a similarity score, the similarity score determined based on a comparison of the health score vector to the other health score vectors; and transmit for display the determined second target entity, health scores associated with the second target entity, and an indication of the associated second time period.

17. The system of claim 16, wherein the similarity score is determined based on a cosine distance measure.

18. The system of claim 16, wherein the first time period is equal to or greater than a week.

19. The system of claim 16, wherein instructions from the one or more non-transitory physical media further cause the system to:

train a neural network model based at least on a second health score vector of the second target entity for a third time period, the third time period including a period of time after the second time period;

input the health score vector of the first target entity to the trained neural network model;

receive a predicted health score based on the inputted health score vector; and transmit for display the predicted health score.

20. A method for news classification, comprising:

receiving an article, the article including text;

extracting text from the received article;

storing the extracted text in a database;

determining a set of target entities based on the extracted text;

determining, by a classification module trained to classify articles based on a news model, a classification of the article for one of the target entities of the set of target entities for a category, valence, presence of litigation, rumor, or opinion based on the extracted text, wherein the classification comprises classifying text relating to the one of the target entities with respect to each of the other target entities, such that said classification assesses the one of the target entity's relational health with respect to each of the other target entities, wherein the news model includes one or more news categories, a valence associated with the category, a litigation indicator, and a rumor or opinion indicator;

associating the determined classification of the article, along with a probability of the determined classification of the article for the one of the target entities;

assigning the determined classification of the article if the probability of the determined classification is greater than a threshold criteria; and storing the associated determined classification of the article and the probability of the determined classification.

21. The method of claim 20, wherein determining the classification comprises:

determining a probability for each category of the news model;

determining a probability of the valence for each news category of the news model;

determining a probability of litigation for the one of the target entities;

determining a probability of a rumor for the one of the target entities; and determining a probability of an opinion for the one of the target entities.

22. The method of claim 20, further comprising:

grouping the article with one or more other articles based on the determined classification;

determining a representative story summary for the grouped articles;

determining a health score associated with the grouped articles based on the valence; and transmitting for display by a graphical user interface a report for the one of the target entities, the report including the representative storyline summary, health score, and information related to the grouping of the articles.

* * * * *